US007865545B1

(12) United States Patent
Estrada et al.

(10) Patent No.: US 7,865,545 B1
(45) Date of Patent: Jan. 4, 2011

(54) SYSTEM AND METHOD FOR INDEPENDENT ROOM SECURITY MANAGEMENT

(75) Inventors: Julio Estrada, Carlisle, MA (US); Miguel A. Estrada, Hollis, NH (US); Maurice B. Shore, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 09/473,098

(22) Filed: Dec. 28, 1999

(51) Int. Cl.
*G06F 15/16* (2006.01)
(52) U.S. Cl. .................. 709/201; 709/206; 713/200; 713/201; 707/103 R; 707/200
(58) Field of Classification Search .......... 713/201, 713/200; 707/10, 103 R, 200; 709/201, 709/200, 206
See application file for complete search history.

(56) References Cited

U.S. PATENT DOCUMENTS

| | | | | |
|---|---|---|---|---|
| 5,129,083 A * | 7/1992 | Cutler et al. | ............ | 707/103 R |
| 5,894,554 A | 4/1999 | Lowery et al. | ......... | 395/200.33 |
| 6,052,730 A | 4/2000 | Felciano et al. | ............. | 709/225 |
| 6,070,185 A | 5/2000 | Anupam et al. | ............. | 709/204 |
| 6,081,788 A | 6/2000 | Appleman et al. | ............ | 705/14 |
| 6,088,707 A * | 7/2000 | Bates et al. | ................. | 715/235 |
| 6,233,600 B1 * | 5/2001 | Salas et al. | ................. | 709/201 |
| 6,278,449 B1 | 8/2001 | Sugiarto et al. | ............. | 345/334 |
| 6,317,777 B1 | 11/2001 | Skarbo et al. | ............... | 709/204 |
| 6,351,777 B1 * | 2/2002 | Simonoff | .................... | 709/250 |
| 6,463,460 B1 * | 10/2002 | Simonoff | ..................... | 709/203 |
| 6,484,196 B1 * | 11/2002 | Maurille | ...................... | 709/206 |
| 6,571,235 B1 * | 5/2003 | Marpe et al. | ................... | 707/3 |
| 6,574,617 B1 * | 6/2003 | Immerman et al. | ............. | 707/1 |
| 6,594,664 B1 * | 7/2003 | Estrada et al. | ................ | 707/10 |
| 6,598,074 B1 * | 7/2003 | Moller et al. | ............... | 709/204 |
| 6,606,744 B1 * | 8/2003 | Mikurak | ..................... | 717/174 |
| 6,611,822 B1 * | 8/2003 | Beams et al. | ................. | 706/11 |

OTHER PUBLICATIONS

Larry Seltzer. "The Virtual Office", *PC Magazine*, Oct. 19, 1999.

(Continued)

*Primary Examiner*—Kyung-Hye Shin
(74) *Attorney, Agent, or Firm*—Holland & Knight LLP; Brian J Colandreo, Esq.; V. Raman Bharatula

(57) ABSTRACT

Collaboration space object model provides for a Place consisting of rooms. A room is made up of pages. Folders are used to organize pages. Members belong to rooms, and are those users authorized to access them. Place type controls the creation of a place, including how many rooms it has, for example. Room type controls the appearance and content of rooms. A form manages the display of data notes. A form can contain fields for containing data and employ scripts to process and compute data. A page is the basic vehicle for content. Content is created using an or importing content from an external source. A member is also a data note, and each place contains its own member directory. A place is created and managed from a client browser in on-line mode and in offline mode with respect to a replicated copy of the space. Room security is independently managed, and security and aesthetics characteristics of subrooms selectively inherited. Room navigation and workflow processing is provided, as are forms creation and uploading from browser to server.

11 Claims, 33 Drawing Sheets

OTHER PUBLICATIONS

Sean Gallagher and Steve Gillmore. "Comparison Review of QuickPlace and eRoom", *Enterprise Development*, Oct. 1, 1999. 14-30.

Steve Gillmore and Jeff Angus. "Teamware Comes of Age", *Information Week*, Sep. 20, 1999.

Brad Grimes. "Hold Your Group Meetings on the Web", *PC World*, Jul. 31, 1999.

Sean Gallagher and Steve Gillmore. "Lotus' Platform Play", *InformationWeek Labs*, May 31, 1999.

Cathy Kenny. "QuickPlace Provides Web-Based Work Site", *PC World*, May 4, 1999.

Matt Kramer. "Lotus lets users build QuickPlace to work", *PC Week*, May 3, 1999.

Lee Sherman. "Virtual Team Rooms", *Knowledge Management*, Apr. 1, 1999.

David Haskin. "Teamware Turns Intranets Into Virtual Workspaces", *Internet World Labs*, Feb. 8, 1999.

* cited by examiner

PRIOR ART    FIG. 4

SYSTEM AND METHOD FOR INDEPENDENT ROOM SECURITY MANAGEMENT

CROSS REFERENCES TO RELATED APPLICATIONS

Co-pending U.S. patent applications:

Ser. No. 09/473,745 filed 28 Dec. 1999, entitled "System and Method for Interconnecting Secure Rooms";

Ser. No. 09/473,630 filed 28 Dec. 1999, entitled "System and Method for Dynamic Management of Web Site";

Ser. No. 09/473,640 filed 28 Dec. 1999, entitled "System and Method for Presentation of Room Navigation";

Ser. No. 09/477,477 filed 4 Jan. 2000, entitled "System and Method for Dynamic Browser Magagement of Web Site";

Ser. No. 09/477,474 filed 4 Jan. 2000, entitled "System and Method for Room Decoration and Inheritance";

Ser. No. 09/477,469 filed 4 Jan. 2000, entitled "System and Method for Online/Offline Uninterrupted Updating of Rooms in Collaboration Space";

Ser. No. 09/477,473 filed 4 Jan. 2000, entitled "System and Method for Client Replication of Collaboration Space";

Ser. No. 09/477,476 filed 4 Jan. 2000, entitled "System and Method for Browser Creation and Maintenance of Forms";

Ser. No. 09/478,238 filed 4 Jan. 2000, entitled "System and Method for Browser Definition of Workflow Documents";

are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention relates to web technology. More particularly, it relates to the creation and use of collaboration sites on the Internet or on an intranet client/server system and to the graphical user interface used in Internet communications.

2. Background Art

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Collaboration requires simultaneous communication between individuals on a project team. Typically, this has required that the team members work in the same location. Phone and video conferencing has enabled some remote work on the part of team members. Also, because of the growth of the Internet, collaboration using web technologies has been attempted, primarily using electronic mail (E-mail), Internet chat rooms, electronic whiteboards, and conferencing software. The most useful has been E-mail, but this approach results in a large trail or thread of notes as collaboration on a project advances, and these notes have no home or place to reside which is accessible by all team members substantially instantaneously and simultaneously. People often enter such a thread at different points, and such threads are not efficient in coordinating the work of many different people on a team which may include in-house developers and others, such as remote contractors, outside of an enterprise's firewall.

In order for such disperse teams to have the same, or substantially the same, collaboration environment as individuals working in the same physical office, a system is required which facilitates instant messaging, voice conferencing, electronic white boarding, and text and non-text file exchange. Such a system needs to provide a collaborative electronic room, or space, which is easily configured for use by team members without substantial administrative or application development support, and preferably include both groupware and project oriented applications such as shared folders, file exchange, workflow, group calendars, threaded conversations, version control, file locking, file merging, and security.

There is a need in the art for such a system which is easy to set up and which enables diverse and remote teams to become immediately productive in a secure environment. It would be, further, most desirable to allow such a collaborative environment to be set up without administrative support, that is by members of the team itself, using a familiar and easy to use browser user interface. Members of the team, acting with manager or author authority, and using such a browser interface without involving administrative or application development support, need to be able to set up a folder or room for each project element, such as a source code component, with version control, workflow elements, and group calendaring for tracking the project or project element with respect to approvals and deadlines. Such a room needs to receive from team members reports and have them routed to appropriate team members for review, resolution, and approval.

FIG. 1 shows a commonly used network arrangement in which a plurality of local computer systems 101-104 in a local area network (LAN) may access a plurality of remote servers 105-108 through the Internet 100. Each remote server may be a web server (such as a Domino™ web server, available from Lotus Development Corporation of Cambridge, Mass.) for providing a web site for access by local computer systems 101-104. Each web site normally further provides a plurality of web pages to be served to the local computer systems upon request. Each local computer system may access the remote web sites with web browser software.

The WWW is a collection of servers on an IP (Internet Protocol) network, such as the Internet, an Intranet or an Extranet, that utilize the Hypertext Transfer Protocol (HTTP). Hereinafter, "Internet" 100 will be used to refer to any IP network.

HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

On the server side, the first web servers were merely HTTP servers that resolved universal resource locators (URLs) by extracting literally from the URL the path to a file that contained the needed page, and transmitting the page back to the browser. Such a server was very simple; it could only be used to access static pages.

A "static" page is a page which, each time it is requested and served to a requestor, has the same byte content. That is, it does not depend upon which requestor is requesting the page, when the requestor is requesting the page, etc., the byte content of that page remains the same. By contrast, a "dynamic page" is a page which has byte content that may very well change depending upon the particular requestor, when the page is being requested, etc. This will be discussed further below.

It is important that web pages be served as quickly as possible, both to reduce the response time to a single user, and to increase the number of users that can be served concurrently. To improve the response time, the Web server uses caches. Web server caches are used to store web page responses in a readily accessible memory location so that when the web page is requested by a user, a previously cached web page response can be retrieved from cache and served quickly to the user.

Heretofore, collaboration on the Internet relied on the use of E-mail. The result has been the creation of a large thread or trail of notes having no home or place. It is a characteristic of such threads that people enter thread at different points and may or may not have ready access to the information required to facilitate collaboration.

In past, there has been no convenient way to take information off a word processor document and put on the Internet in one step. To put a document file on the Internet for viewing, a user must establish a web server, load the file into a word processor, save it as HTML, and then find other related files and copy all of the files to the web server, and put them in the correct directory. One solution for this complex procedure is a web folder, that allows a user to upload files to Internet for viewing. Such a web folder presents a web server to the user as if it were a regular file directory, so the user can save the files to this directory. Even in this solution, it is still necessary for the user to establish the web server or obtain permission to use one already created. Further, this approach does not present context of document to the user during the upload process. Consequently, there is a need in the art for a way for a user to create a web site without web server, and create a document with pages within that site a created context, which is where on the Internet this document appears.

Previously, in a hierarchical database, security could not be increased in subfiles with respect to a parent file. Also, in the past, directory entries or other indicia identifying objects to which a user did not have access were shown, but were greyed out or otherwise managed so that user access was inhibited. There is a need in the art, therefore, for providing for managing access to files in a hierarchical database where security may increase or decrease at a child with respect to its parent, and where indicia identifying objects to which the user does not have access not displayed.

Heretofore, a user can upload a document to a web site through the use of directories and file trees. These may not be intuitive for the user. Consequently, there is a need in the art for a way to upload documents which involves the more intuitive process of dragging and dropping the document to the spot on the site where it is to be rendered.

In accordance with various systems for supporting remote application execution, a Java version of a database engine is configured with a transactional replication feature by which there is brought down from a server to a browser, client data and application logic, or dynamic HTML is downloaded to a browser environment where developers can write a transportable application from scratch. However, these systems, including the transactional replication feature, do not download the security model, and thus are not user filtered in the sense that access control lists, reader filtration, and selective replication are supported at the browser. Security, in such systems, is administered at the server, and not at the browser. Consequently, there is a need in the art for a system and method which enables full replication of server functions at a browser, which may be operating off line from the server, which functions include application code, data, and security.

Previously in web technologies, generation of graphics was done manually. A graphics artist would use Adobe Photoshop or Paintshop Pro, and similar applications, responsive to a specification provided by a requester for a particular graphic, and to generate for it a graphic file, in, for example, a graphics interchange format (.gif). This is a time consuming process, and not dynamic in the sense of generating web sites, etc. A designer needs to lay out the fonts, graphics, etc, and may need to change the character set to make the resulting graphic viewable in other countries or cultures. Consequently, there is a need in art to get graphic artist out of the loop, and make the process dynamic.

Heretofore, a user could not interactively create and modify a web site. The process for creating a web site has been to use the file transfer protocol (FTP) to upload files that define the site. There is a need in the art for a way to enable a user at a browser to create a site, including a place and rooms, and then to create and modify folders and make other structural changes to the site.

Heretofore, templates and wizards have existed for designing the aesthetic characteristics of a web site. However, there has been no way for the aesthetic characteristics of a parent object to be inherited by its children objects.

Heretofore, people can design forms locally using HTML and upload them to their web site. The problem in doing this is that such a form is strictly a layout of fields, and there is no logic that defines where and how the data should be stored. Consequently, there is a need in the art for a server having facility for accepting and storing form data in a page.

Workflow involves having someone fill out a form and submit it on the web. The form then travels to individuals in a prescribed set and order. Typically, for providing workflow on the web, a Domino designer designs a data base containing the form that is used by others having access to that database. There is a need to allow users, not skilled as designers, to create workflow documents from a web browser.

It is an object of the invention to provide a system and method which enables a user to accelerate productivity by easily creating and maintaining collaborative spaces on a network.

It is a further object of the invention to provide a system and method which enables a user to customize security attributes of rooms in a collaborative space including a hierarchy of rooms.

It is a further object of the invention to provide a system and method for providing collaborative space for each project of a plurality of individual browser created and managed projects.

It is a further object of the invention to provide a system and method for creating collaborative space that is expressive and offers a range of features that allow individuals to express their own personalities, such as through the use of graphics and animations.

It is a further object of the invention to provide a system and method for creating collaborative space that is readily accessible to the user, capable of being installed from a web service or from a CD with very little effort.

It is a further object of the invention to provide a teamwork system and method for enabling teams and workers within or between companies to easily set up a common electronic workplace to communicate, share and organize information and documents around any task, project, or initiative.

It is a further object of the invention to provide a team ware system and method which supports small teams that are working together on very project centered or activity oriented things.

It is a further object of the invention to provide a system and method for uploading a document without opening it but by selecting and putting the file to a place automatically.

It is a further object of the invention to provide a system and method for uploading documents which involve the more intuitive process of dragging and dropping the document to a spot on the site where it is to be rendered.

It is a further object of the invention to provide a system and method including within a web site a context for files allowing a user at a browser to create a new page and determine its location.

It is a further object of the invention to provide a system and method for automatically converting a file while dragging the file to a new place.

It is a further object of the invention to provide a system and method for drag and drop uploading from a browser to a server of non-HTML files viewable as HTML files and editable as non-HTML files.

It is a further object of the invention to provide a system and method for managing security of files in a hierarchical database such that security may increase or decrease at a child with respect to its parent.

It is a further object of the invention to provide a system and method for managing a hierarchical database such that indicia only identifying objects to which the user does have access are displayed.

It is a further object of the invention to provide an end user a dynamic system and method for generating graphical displays.

It is a further object of the invention to provide a system and method for enabling a user to dynamically create and modify a web site.

It is a further object of the invention to provide a system and method for enabling browser creation and modification of web sites.

It is a further object of the invention to provide a system and method for enabling uninterrupted online and offline updating of a web site.

It is a further object of the invention to provide a system and method whereby the aesthetic characteristics of a parent room may be inherited by its children rooms.

It is a further object of the invention to provide an offline user a full web site interaction experience.

It is a further object of the invention to provide a system and method whereby a user at a browser may create forms, and incorporate them into a room.

It is a further object of the invention to provide a server system and method for accepting and storing form data in a page.

It is a further object of the invention to provide a system and method for enabling a browser to define a work flow document and process.

SUMMARY OF THE INVENTION

In accordance with the invention, and system and method is provided for maintaining collaboration space including a place comprising a plurality of rooms linked by pointers. A member directory for the place identifies users authorized to enter the place. Each room in the place includes one or more pages and a members object for identifying members authorized to access room, and for each member a level of authorization.

Other features and advantages of this invention will become apparent from the following detailed description of the presently preferred embodiment of the invention, taken in conjunction with the accompanying drawings.

BEST MODE FOR CARRYING OUT THE INVENTION

In accordance with a preferred embodiment of the invention, a collaboration system or teamware server platform is provided which is powered by the Lotus Domino system and uses a standard Web browser. A product implementation of this embodiment is referred to as QuickPlace™. This browser-based product provides a system environment for collaboration in the virtual world of the Internet characterized by rich text editing and drag-and-drop uploading, server-side graphics rendering, scene-based templates (or, wizards) for performing administrative tasks, and hierarchical security.

In accordance with the invention, a server system is provided which enables users to create space on a network that is easy to create, making them productive right away. All that is required to create that space is a name, a place name, and a password for access. The QuickPlace approach is to give a sense of space where information can be entered and posted, where people go to collect thoughts and collaborate, and to provide a place or space characterized by ease of creation and maintenance. The QuickPlace approach provides a place for each project.

Exemplary Server/Client System

Figure 4:
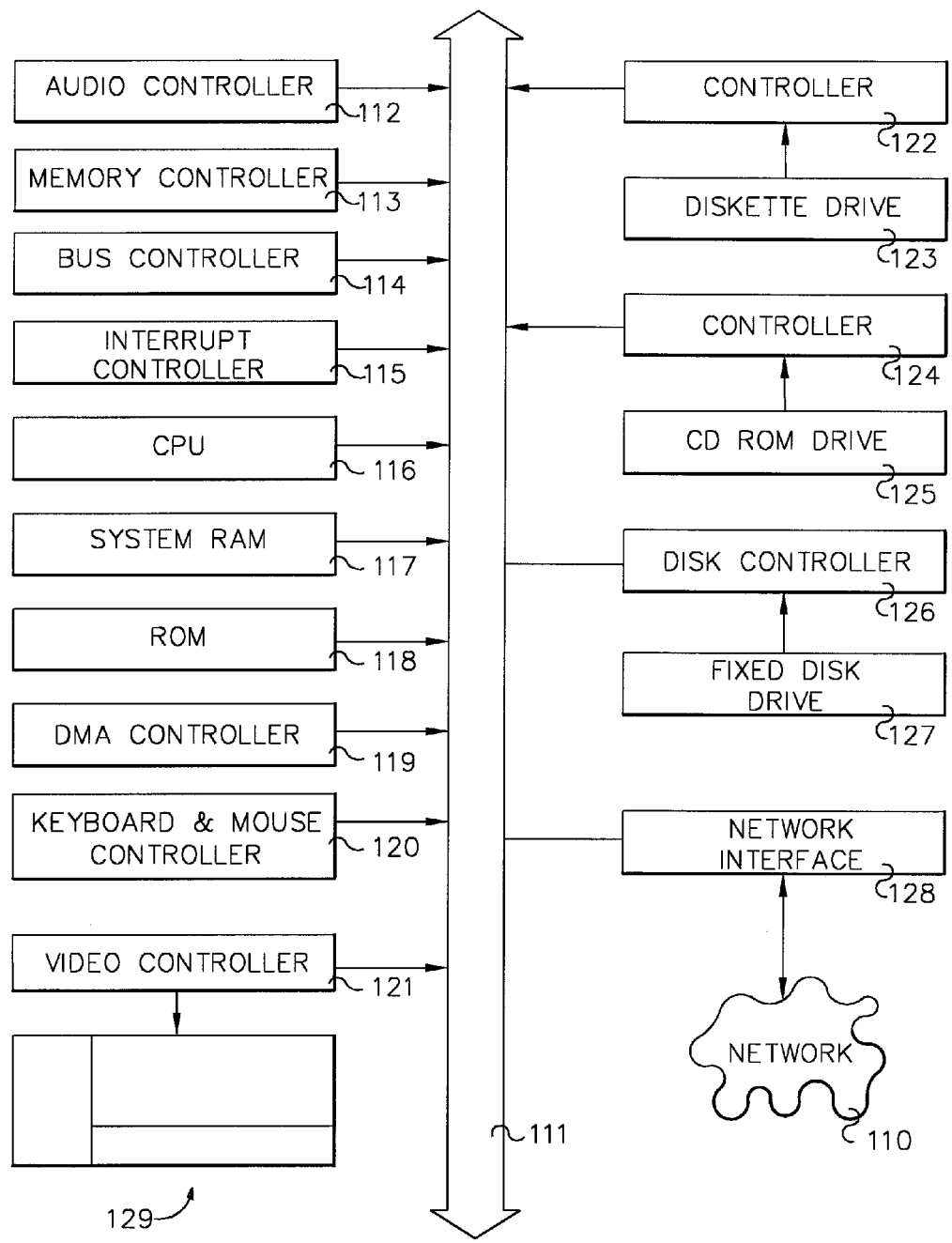
FIG. 4 is a system diagram of a prior art computer which may be used at a client or server node in connection with the invention.

By way of background, FIG. 4 illustrates the system architecture for an exemplary server 105 or client computer 101, such as an IBM THINKPAD 701® computer or like computer, on which a network access system can be implemented. The exemplary computer system of FIG. 4 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 4.

The server 105 or client 101 computer includes a central processing unit (CPU) 116, which may include a conventional microprocessor, random access memory (RAM) 117 for temporary storage of information, and read only memory (ROM) 118 for permanent storage of information. A memory controller 113 is provided for controlling system RAM 117. A bus controller 114 is provided for controlling bus 111, and an interrupt controller 115 is used for receiving and processing various interrupt signals from the other system components.

A diskette, CD-ROM, or hard disk may provide mass storage. Data and software may be exchanged between client 101 and server 105 via removable media, such as a diskette or CD-ROM. A diskette is inserted into diskette drive 123, which is connected to bus 111 by controller 122. Similarly, a CD-ROM can be inserted into CD-ROM drive 125, which is connected to bus 111 by controller 124. A CD-ROM can also have digital versatile disc (DVD) playback capabilities as well. Finally, the hard disk is part of a fixed disk drive 127, which is connected to bus 111 by controller 126.

User input to the server computer 105 may be provided by a number of devices. For example, a keyboard and a mouse may be connected to bus 111 by keyboard and mouse controller 120. An audio transducer, which may act as both a microphone and a speaker, is connected to bus 111 by audio controller 112. It should be apparent to those reasonably skilled in the art that other input devices, such as a pen and/or tablet and a microphone for voice input, may be connected to server computer 105 through bus 111 and an appropriate controller. DMA controller 119 is provided for performing direct memory access to system RAM 117. A visual display is generated by a video controller 121, which controls video display 129.

Server computer 105 also includes a network adapter 128 that allows the server computer 105 to be interconnected to a network 110. The network 110, which may be a local area network (LAN), a wide area network (WAN), or the Internet, may utilize general-purpose communication lines that interconnect a plurality of network devices.

The Web server 105 answers URL (Universal Resource Locator) requests by sending back pages of data encoded in HyperText Markup Language (HTML). It also handles URL requests and HTML forms that trigger executable programs according to the Common Gateway Interface (CGI) specification. The Web server 105 includes code that manages both inbound and outbound HTTP (HyperText Transfer Protocol) communications. In these respects, the Web server 105 performs like any other HTTP server, responding in the standard way to standard URL requests. The preferred embodiment will be discussed primarily in terms of a Lotus Domino web server 105 although the system and method of the present invention may be implemented in any web server.

Figure 1:
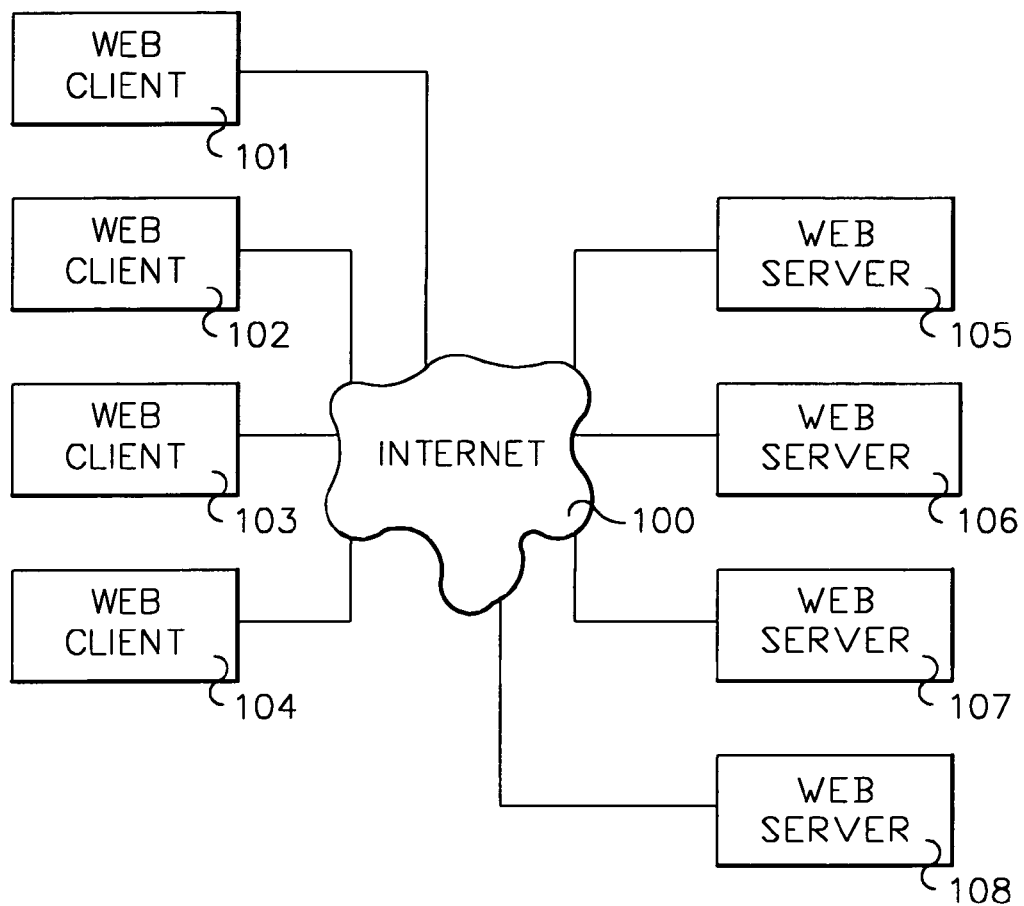
FIG. 1 is a system diagram of a prior art Internet environment.
Figure 2:
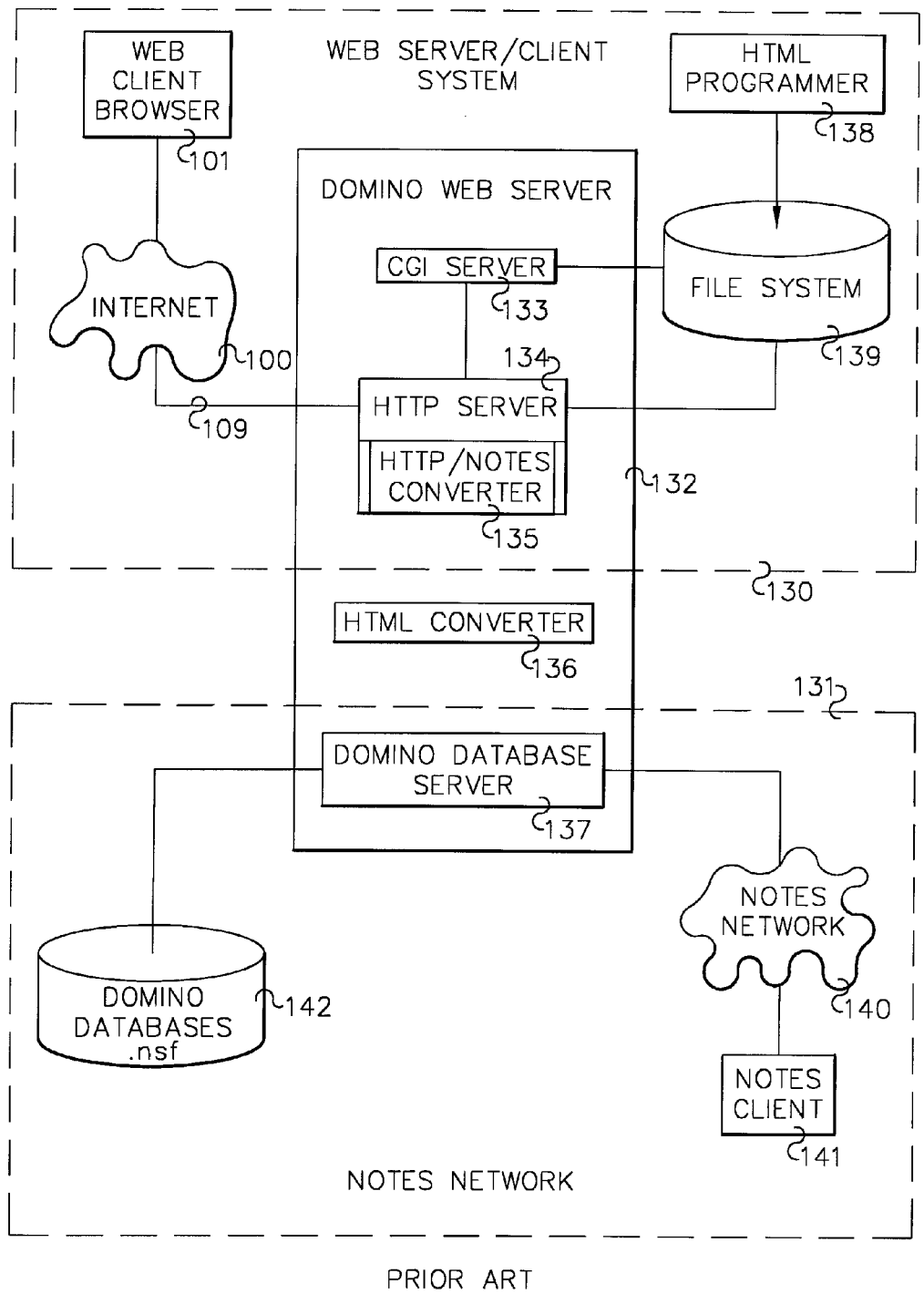
FIG. 2 is a system diagram of a prior art Notes/Web environment.

By way of further background, as can be seen in its most basic form in FIG. 2, web server/client system 130 and Notes network 131 include a Domino web server 132 having many tasks running on it simultaneously. Among the server tasks are the Domino database server tasks 137, i.e., serving up documents from Domino databases 142, and the HTTP server tasks 134, i.e., serving up documents having formats such as HTML, GIF, JPEG, XML, DHTML, BMP, MPEG, WAV, Java applets, and other file formats known to those skilled in the art from file system 139 via common gateway interface (CGI) server 133.

Notes software, available from Lotus Development Corporation, works with Domino to provide a distributed client/server database application to let users organize, process, track, and use information to suit their individual needs. Notes/Domino consolidate the tools needed to effectively communicate and collaborate in an organization by providing, inter alia, email, group discussion, workflow, scheduling, document management and many other functions. Domino databases are built on three basic concepts: documents, views and forms. Documents are collections of data items which can be retrieved as a set. Views are the ways of accessing the indices or summaries of documents stored in a database while forms are templates for accessing and displaying documents.

When a Notes client 141 requests access to a Domino database 142 via the Notes network 140, the Domino database server task 137 provides access. When a web client 101 requests an HTML document, the HTTP server task 134 provides it. When a web client 101 requests a Notes document, the HTTP server task 134 passes the request through to the Domino database server task 137. If access is granted, the Domino database server 137 retrieves the requested document and passes it to an HTML converter 136 which converts the Notes views, documents, and forms from Notes format to HTML format, then delivers the resulting HTML pages to the HTTP server 134 for serving to the web client. If a web client submits a form or query, the HTTP server task 134 passes the form to the HTML Converter 136 which converts the form to Notes format and passes it to the Domino database server 137 for appropriate processing.

Heretofore, to set up a web site, connection 109 between HTTP server 134 and network 100 is disconnected while an HTML programmer 138 modifies file system 139. In accordance with the present invention, such a disconnection is not necessary.

Referring further to FIG. 2, in operation, HTTP server 134 takes URLs from a client 101, and looks to file system 139 to get the URL to serve to client 101. Domino database 142 provides Notes functionality (workflow, security, etc.) to a web server 132. A web server includes HTTP server 132 and file system 139, CGI server 133 which provides a parallel path HTTP server 134 to file system 139.

QuickPlace objects are implemented on top of Notes.

Notes server 137 provides an interface for enabling an owner to provide Notes functions to web servers/clients. Server 137 enables a user to use Notes functions via a web client browser 101 on the Internet 100. This it does by providing in HTTP server 134 an HTTP to Notes converter 135. Thus, a command or URL from web client 101 in HTTP protocol (get, getnext, openform, getmail, etc.) is parsed as a Notes command in converter 136 and sent to data base server 137. Buried in the URL is the Notes command that is parsed out.

To access E-mail, the command to do so is included in the URL command, this is parsed out and sent out to database server 137, which accesses database 142. HTML converter 136 converts .nsf (notes store facility) to HTML format, which it then provides to HTTP server 206, to be served to web client 101.

In accordance with a preferred embodiment of the invention, a QuickPlace server is a modified Dominos server 132. QuickPlace is a virtual server on the same machine as, for example, many other domino and/or QuickPlace servers.

Referring further to FIG. 2, QuickPlace is a smart master (also referred to as a wizard), a template for creating a web site which doesn't require an HTML programmer 138 to set it up. Previously, a programmer 138 would have to program into the file system 139 the code needed to set up the web server Internet site with the web server disconnected at 109 from the web site. In accordance with the present invention, web client 101 or notes client 141 can design site without bringing down the web connection 109. This is done by starting with a default web site and build from there. The default is built upon by using point/click, color selection, room creation rooms, file drag and drop files, input files directly to site, control access to site (manager, author, reader), and so forth.

Web Server Cache

Figure 3:
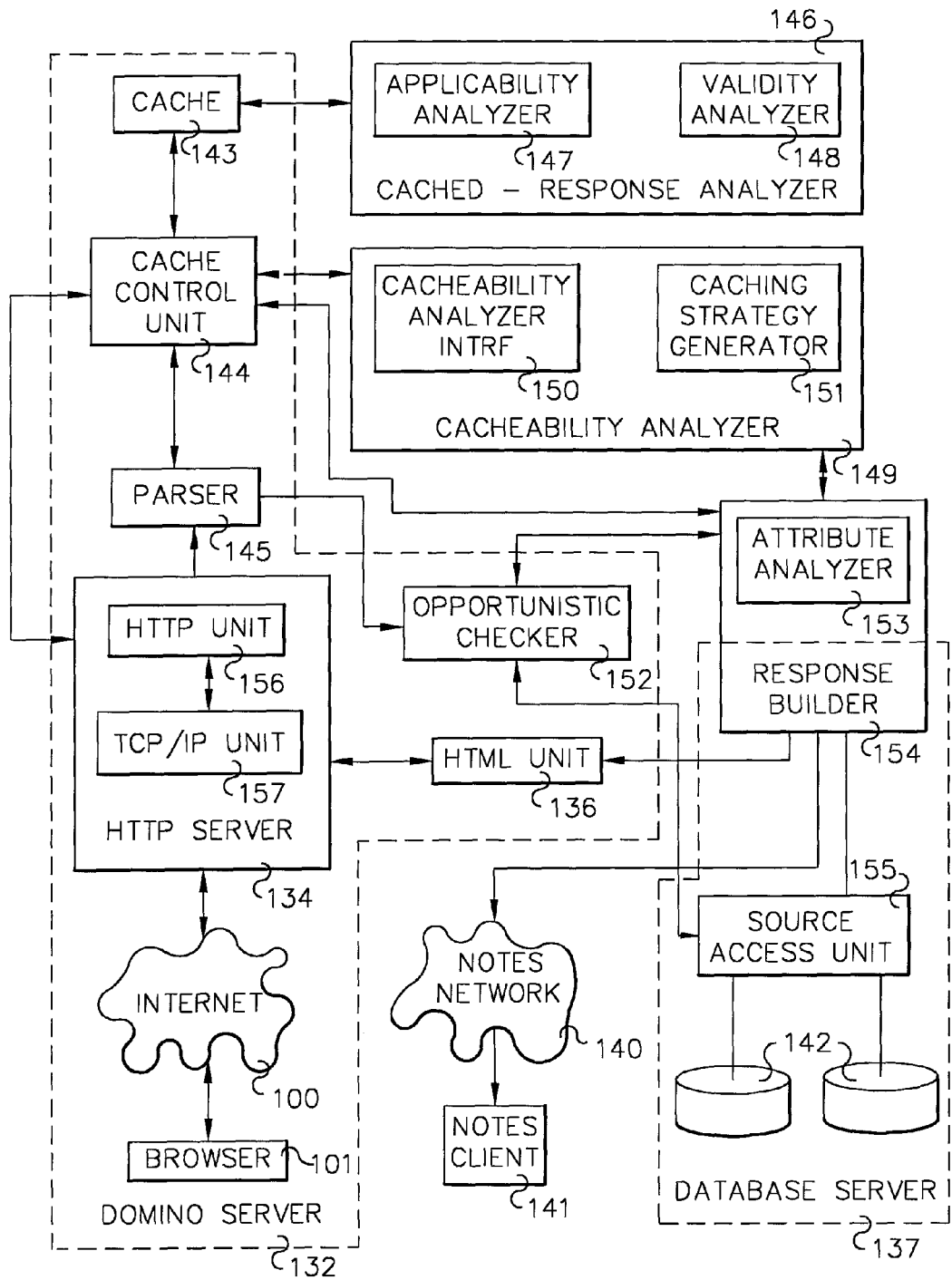
FIG. 3 is a system diagram of a server having caching capability adaptable for use in the system and method of the invention.

FIG. 3 is a block diagram of a web server system having a caching system useful in connection with the preferred embodiments of the present invention, and is an example of a domino server without QuickPlace shown. As will be described more fully hereafter, QuickPlace allows a user at browser 101 to use a default website and from that as a manager to set security, pop up a window, add reader/author, distribute notifications and passwords to control access, create a room which gives options for customizing color scheme, control access to the room, create sub room down as many layers down, with each subroom selectively inheriting characteristics of a previous room, and changing these characteristics.

As shown in FIG. 3, the web server 132 may be connected to a number of Domino sources 142. However, the sources may comprise any number of different types of elements, other than Domino databases: other databases, files, other web sites, etc, but Domino sources are shown for clarity. The web server may also be connected to HTML databases 139 as was discussed above. The web server 132 comprises and is associated with many functional units. It comprises the HTTP server 134, discussed above, which comprises a TCP/IP application 157, and a HyperText Transfer Protocol (HTTP) unit 156. The web server 132 further comprises the HTML converter unit 136 discussed above. It further comprises a parser 145 (for parsing received URLs), a cache 143, cache control unit 144, and operates in cooperation with a cached-response analyzer 146, and a database server 137, including a response builder 154, a source access unit 155, and a cacheability analyzer 149.

These units operate as follows: TCP/IP unit 157 and HTTP unit 156 act together as the interface to the Internet by implementing the TCP/IP and HTTP protocols for server 132. TCP/IP unit 157 utilizes the TCP/IP protocol for conveying and receiving information to and from the Internet. HTTP unit 156 implements HTTP, which is the standard on which the Web operates. These two units provide the full-service interface to the Web.

When server 132 receives a URL from a client, the HTTP server 134 passes the URL to the URL Parser 145, which breaks the URL into different parts. The parsed URL is passed to the cache control unit 144. With a Domino server, within the URL that is received from the requesting user is a Domino/Notes-specific command, which indicates what action is being requested. The following are examples of server specific commands within the URL that may be received by the Domino server:

?OpenDatabase—command for opening a database;
?OpenView—command for opening a view;
?OpenDocument—command for opening a document;
?OpenForm—command for opening a form;
?ReadForm—command for reading a form; and
?EditDocument—command for editing a document.

While, in this example, each of these commands has a "?" in front of the command as syntax that the server can use to identify the string as a command, the server can identify other syntaxes as well. These commands require a response to be sent to the requesting user. The requested response may have already been cached and it may be valid and applicable. For those URLs having commands requesting a possibly-cached response (i.e., ?OpenDatabase, ?OpenView, ?OpenDocument, ?OpenForm, and ?ReadForm), the cache control 144 examines the request against previously cached responses to determine whether any of the previously cached responses is appropriate for the request. This is done by comparing the parsed URL against the URLs of the previously cached responses in the cache 143. If there is not an exact match or if the URL doesn't have "cacheable" commands (e.g., ?EditDocument), the parsed URL is passed to the response builder 154. The response builder 154 uses the parsed URL to build the response by accessing the appropriate sources (via source access unit 155) and retrieving the appropriate "parts" to construct the response. The parts retrieved by the response builder 154 may comprise many different types, including data, forms, subforms, database design elements, calculations, etc. In other words, there is no theoretical restriction as to the type of parts comprising a web page response. These parts each have their own attributes. For instance, some parts may or may not have last modified dates associated with the part. The attributes of all of the parts used to build the response are collected and analyzed by attribute analyzer 153. The attribute analyzer 153 builds a "composite" of the attributes, the attribute composite being representative of the entire response.

Once the web page response is built by the response builder 154, it is passed to the HTML unit 136 for conversion to HTML. This HTML response is then passed to the HTTP server 134 for serving to the requesting user. At the same time, the attribute analyzer 153 passes the composite of the parts' attributes to the cacheability analyzer 149 for determining the cacheability of the built response. The cacheability analyzer 149 examines the attribute composite and, if it determines that the response cannot be cached, the response is not cached. If it determines that the response can be cached, it provides an indication to the cache control unit 144, along with the response and an associated set of cache strategy indicators generated by the cacheability analyzer 149. These indicators are used by the cached-response analyzer as discussed below. The cacheability analyzer 149 comprises a cacheability analyzer interface 150 and a caching strategy generator 151. The cacheability analyzer interface 150 acts as an interface for the cacheability analyzer 149 while the caching strategy generator 151 examines the attribute composite and creates a caching strategy.

If the cache control unit 144 determines that there is an exact match between the parsed URL of the user request and the URLs corresponding to one of the cached responses in the cache 143, the candidate cached response along with its associated cache strategy indicators is passed to the cached response analyzer 146. The response analyzer 146 performs two series of tests. The first series of tests are response-specific and the second series of tests are request-specific. The response-specific tests are performed by the validity analyzer portion 148 while the request-specific tests are performed by the applicability analyzer portion 147. If the candidate cached response and its associated attributes pass the two tests, the candidate cached response is simply served up to the user at browser 101 via the HTTP server 134.

Co-pending patent application Ser. No. 09/237,135 filed 25 Jan. 1999, provides additional detail with respect to operation of servers 132, 137 and related components.

Collaboration Space Server

Figure 5:
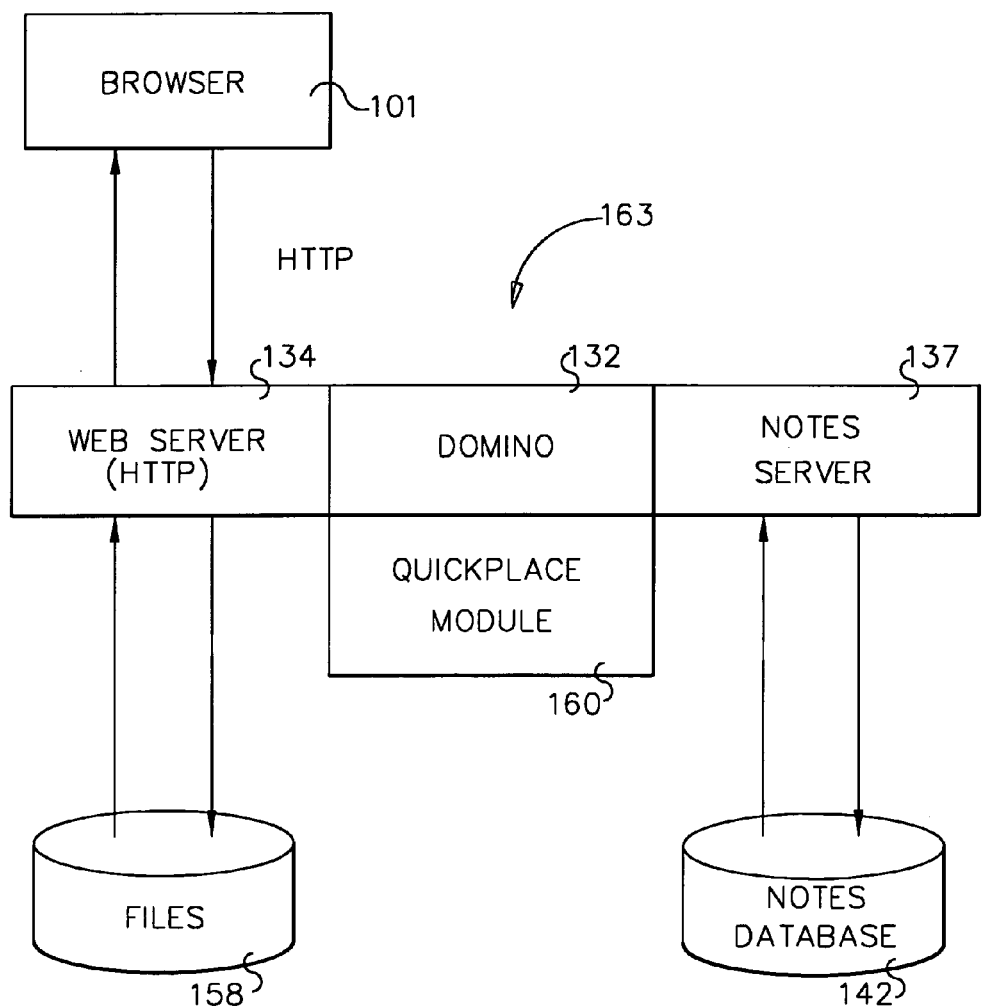
FIG. 5 is a system diagram illustrating the place server of the preferred embodiment of the invention.

Referring to FIG. 5, the Domino structure 132 is enhanced with QuickPlace extensions 160 to provide a Notes/web interface for providing collaboration. In a preferred embodiment of the invention, a full blown Domino server is installed, including web server 134 and Notes server 137, and then the QuickPlace module 160 is installed as an overlay.

Figure 8:
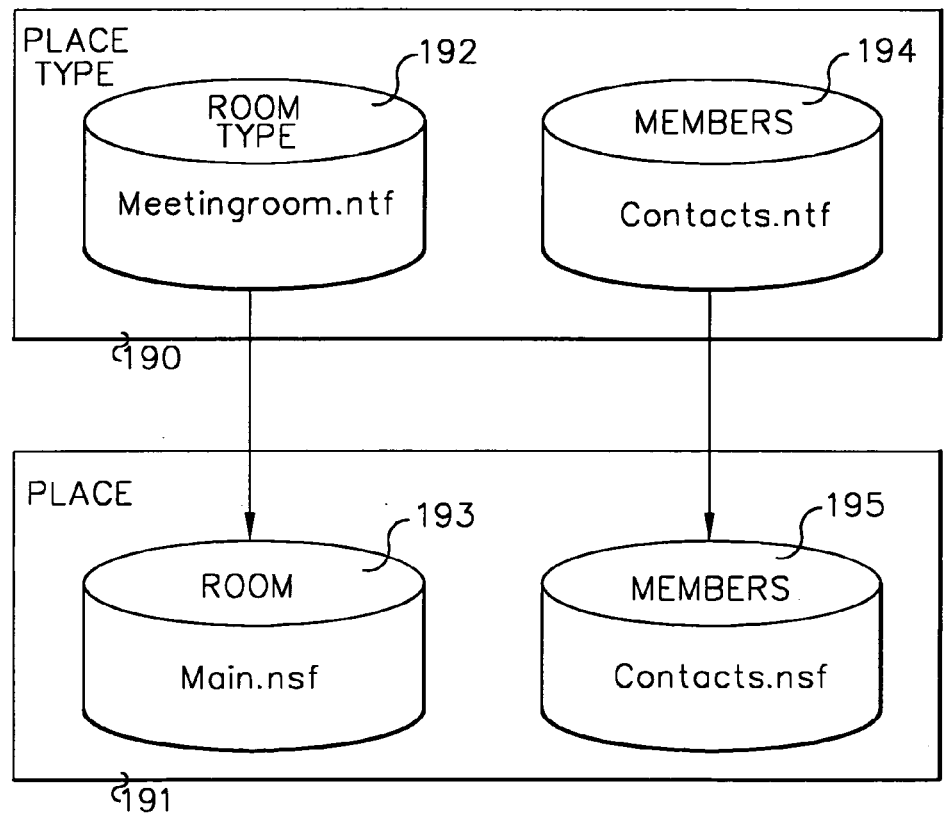
FIG. 8 is a diagram illustrating the creation of a place.
Figure 9:
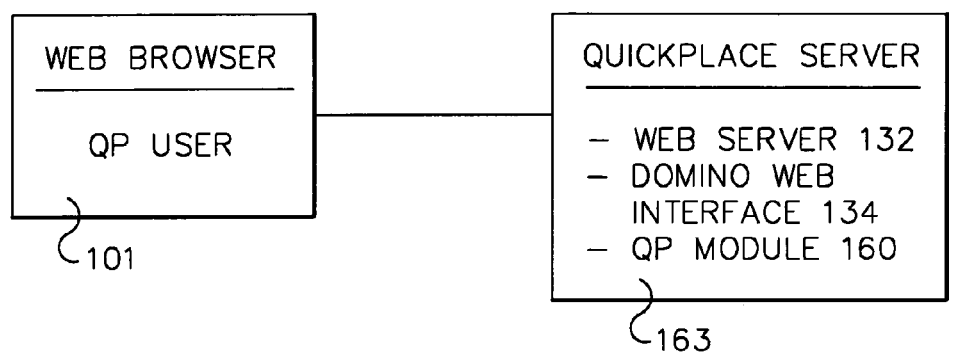
FIG. 9 is a system diagram illustrating components of the place server of FIG. 5.

Referring to FIG. 9, in another preferred embodiment a QuickPlace server 163 includes web server 132, domino web interface 134, a QuickPlace module 160, and a notes server, providing a product to which web browser 101 and Notes clients can connect. Objects within QuickPlace module 160 include a place with rooms, rooms having folders (optional) and pages; and a place has members. When a place is created, one room is created in which pages can be created. A place is created from a placetype, which is a template that specifies the number of rooms, members, security for rooms, look and feel, and forms and folders in each room. A place type was once a place, which is saved as a template from which new places can be created. A place is a directory which is created from a template by entering place name, person name and desired pass word. The directory is created in file system 139, with one database for each room. Thus, a room is a QuickPlace object that maps to a Domino database. The manner in which this mapping occurs will be described hereafter in connection with FIG. 8.

Figure 14:
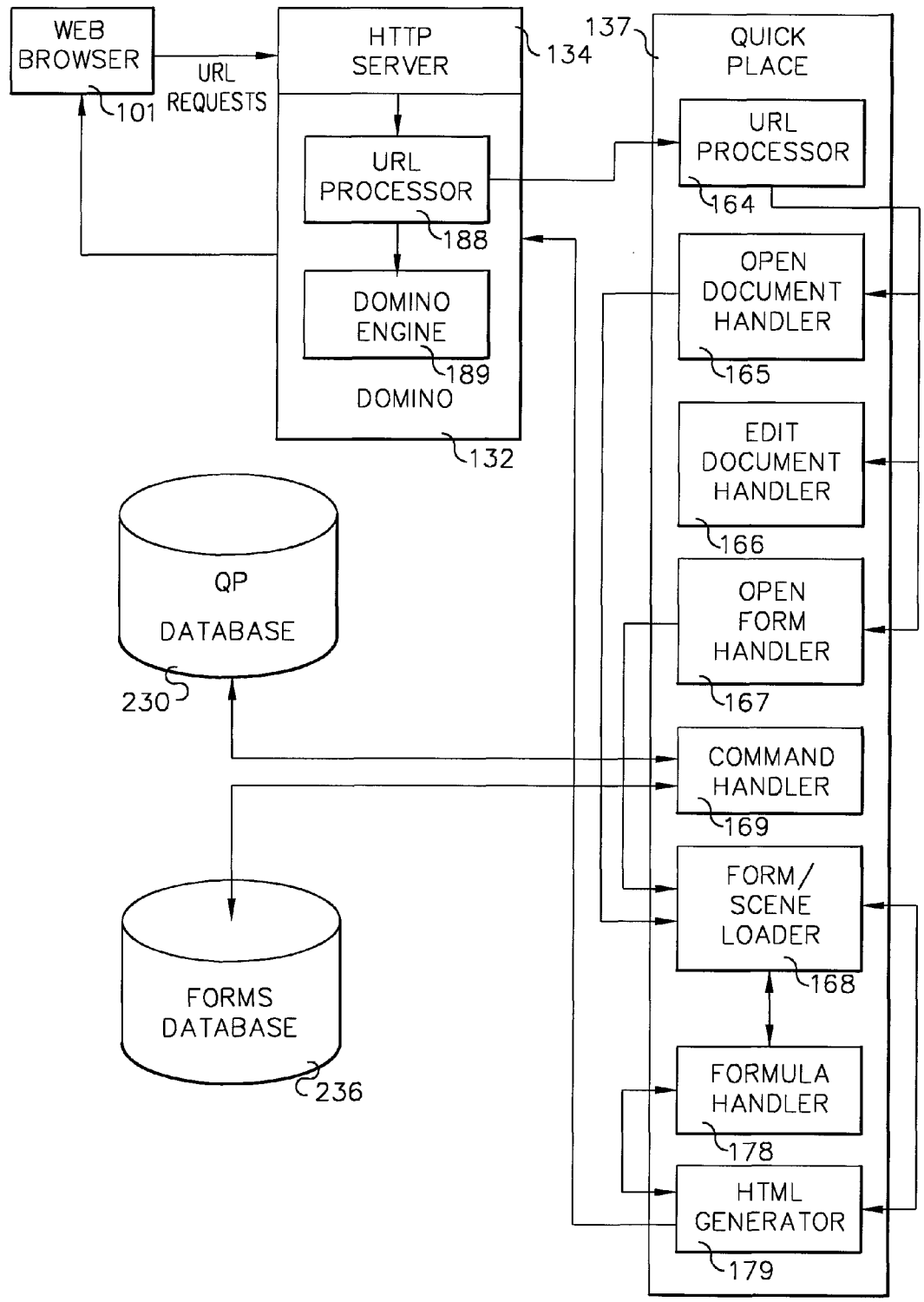
FIG. 14 is a system diagram illustrating the QuickPlace server of the preferred embodiment of the invention.

Referring to FIG. 14, a system architecture view of the QuickPlace server 137 is presented in the context of a system including a web browser 101 and Domino server 132. Domino server 132 includes HTTP server 134, URL processor 188, and Domino engine 189. QuickPlace server 137 includes URL processor 164, open document handler 165, edit document handler 166, open form handler 167, form/scene loader 168, command handler 169, formula handler 178 and HTML generator 179.

URL requests are received by Domino 132 from browser 101, and are of the following syntax:

(1)    http://server/dir/db/view|folder|form/doc?command &command arguments

Examples of URL requests are:
(2) http://QuickPlace/ACME/Main.nsf/PageUI?OpenForm
(3)    http://QuickPlace/ACME/Main.nsf/Discussion/ L0999047 docID?EditDocument&Editscreen=" "

A URL request received from browser 101 is fed by HTTP server 134 to URL processor 188, which examines the URL to determine if QuickPlace is specified as the server. If not, the URL is passed to the domino engine for process. If QuickPlace is specified, the URL is passed to QuickPlace server 137 where it is received by URL processor 164.

URL processor 164 examines the URL from the browser, received via Domino server 132, to determine the command, and depending upon that command passes processing to open document handler 165, edit document handler 166, or open form handler 167. In resolving these commands, handlers 165-167 reference a library of Domino and QuickPlace classes, including the following:

Domino Classes:
 NDatabase
 NView
 NNote
 NDocNote
 NFolder
 NForm

Quickplace Classes:
 HuUiDoc
 HuForm
 HuView
 HuDocNote
 . . .

Responsive to an open document command in a URL including QuickPlace in the URL prefix, open document handler 165 instantiates a database class using the Domino and QuickPlace classes, which involves opening the database containing the document, the view containing the document, and the document itself. This involves a call to form/scene loader 168, which determines and loads the proper form and the scene. A form describes the document items of interest to a particular request, and the layout of the page for that request, as specified by the URL from the user browser 101. In the process of loading the form and scene, loader 168 may determine that there is a formula; and if so, it is passed to formula handler 178 for processing. HTML generator 179, responsive to loader 168 and, if a formula is included, to formula handler 178 to generate the HTML and send it to the user browser 101 via Domino 132.

Responsive to an open form command in a URL including QuickPlace in the URL prefix, open form handler 167 is called by URL processor 164 to create a new document in the database specified by the URL, inside the view or folder specified in the URL. Open form handler 167 calls form/scene loader 168, which loads the appropriate form and scene. This may require a call to formula handler 178 to resolve any formulas in the form, and HTML generator 179 takes the information provided by form/scene loader 168 and, possibly, formula handler 178, and passes back to Domino 132 the HTML for display at web browser 101. If there are any commands to be executed as a result of creating a document, open form handler invokes command handler 169 to execute the command. These commands includes create, delete or edit room, user, or folder; or the publishing commands make draft, make draft from published, publish, save under construction, revert, and discard. The make draft command is invoked to create a document. The publish command publishes the draft which then becomes published (a document in which a published field gets set to on). To change a published document, the user issues a URL including the edit document command. QuickPlace server 137 creates a draft document from the published version. The user can change the draft document, and then issue a command which either reverts the draft document back to the published version, save the draft as a document under construction, or discard the draft.

Thus, in overview, the open form handler 167 operates according to the following procedure.

Browser 101 issues a URL containing the open form command, something like the following:
      URL:/QuickPlace/AEME/Main.nsf/PageUI?OpenForm
   Domino sees that the server specified in the URL is QuickPlace, and passes the URL to QuickPlace 137.
   URL processor 164 parses the URL and determines that it is an OpenForm command, and passes it to open form handler 167 for processing.
   Open form handler 167 determines that the command is for the ACME place, for its top room Main.nsf, and using the pageUI form.
   With that information, open form handler 167 creates a draft document by calling the make draft publishing command. (When a room is created, first a draft is created, which is then published, and then the create room command is executed.)
   So, open form handler 167 has first created a draft. With that it calls form/scene loader 168 with the given form and scene for the draft document, which it loads in memory. As part of loading the draft document, formulas may be computed in formula handler 178—and this may involve the selection of default values. Once the draft document is loaded in memory with the given load and scene, form/scene loader calls HTML generator to generate the HTML to be sent to browser 101 via Domino 132, and the document with its fields is presented to the user.

Responsive to an edit document command in a URL including QuickPlace in the URL prefix, edit document handler 166 executes the procedure to be described with reference to FIG. 15. This command is similar to open document, except in the case of edit document the document already exists in database 230 for the QuickPlace specified in the URL from browser 101. In this case, suppose the URL is of the following form:
   url:/quickplace/acme/main.nsf/discussion /docid?editdocument &editscene where acme is the directory, main.nsf is the database, discussion is the folder, docid is the document, editdocument is the command to be executed, and editscene is the first of a list of command arguments—a list of arguments, each argument separated by the & delimiter. Execution of this command will result in opening given document docid, which is located in acme place, top level room main.nsf discussion folder. To do so, edit document handler 166 uses the Domino and QuickPlace classes to open folder discussion and document docid, and calls form/scene loader 168 to load appropriate form and scene from haikucommonforms database 236 (forms is older terminology for scenes).

A scene controls the layout and defines the data to be captured from user, such as type of QP to be created. A scene also specifies the actions or choices to be presented to the user, such as next or back. Next brings up another scene, and a series of scenes can be used, for example, to change the type of a QP place (place type). Thus, scenes are like steps, each scene is represented by a screen for display at browser 101, and the user can move back and forth. This will be described, for the case of the edit document command, with reference to FIG. 15, which illustrates the edit cycle executed under control of edit document handler 166.

Figure 15:
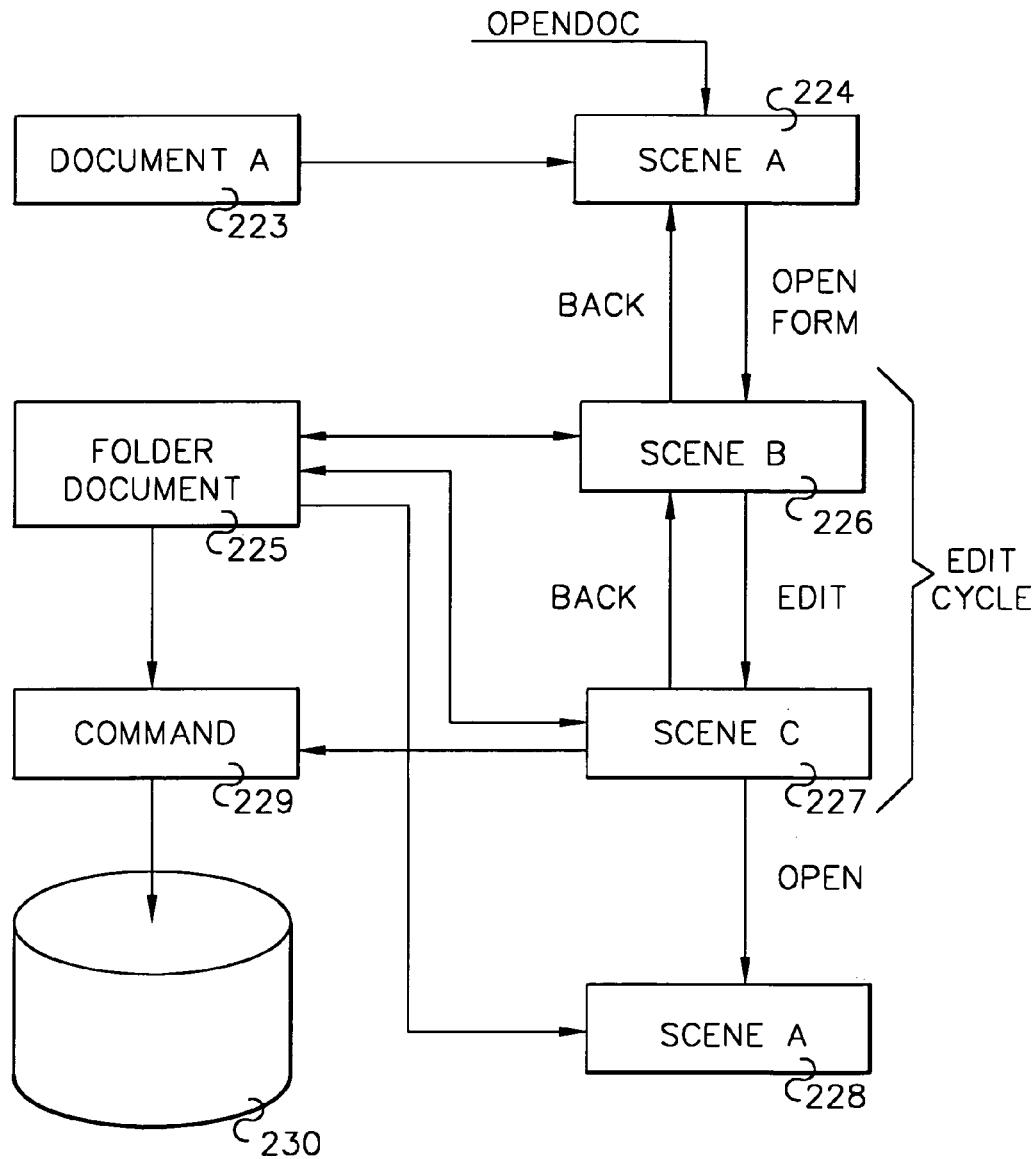
FIG. 15 is a diagram illustrating processes executed by the QuickPlace server of FIG. 14 for executing browser URL commands with respect to a QuickPlace database.

Referring to FIG. 15, in connection with FIG. 14 and the URL command issued from web browser 101 by the user of:
   url:/quickplace/acme/main.nsf/discussion/docid ?editdocument &editscene who desires to edit the document docid in database 230. The process involves the creation and use of scenes 224, 226, 227 and 228. Scene 224 has been created previously in response to an open document command from browser 101, as explained above, which caused form/scene loader 168 to go to QP database 230 to retrieve document 223 from which scene 224 was derived and displayed as a screen at browser 101. Scene 224 gave the user the opportunity to select NEW, resulting in an open form URL request being sent by browser 101 to server 137, which resulted in open form handler 167 creating a folder document 225 in memory and in forms/scene loader selecting and returning to browser 101 display scene 226. Scene 226 gives the user the opportunity to select an edit command, and the above URL1 resulted from that selection.

Recapitulating, open form created document 223, selected the scene A 224, generated corresponding HTML1 and sent it to browser 101. Now browser 101 displays document 223 (which is created at the browser by scene 224), and by the user selecting NEW, open form is issued to the server, which will open form and return scene B 226. User is now in the edit cycle, in the process of supplying information to the server 137 through the scenes 226 and 227 in order to created the document 225—it is a multi-step process. It is a cycle because it a has a beginning and an end, and is edit because document 225 is being modified.

Thus, with browser 101 displaying scene B 226, the user is given several choices to perform actions (all scenes have actions, represented by buttons, menu choices, or the like) and, in this case, NEXT is an action option. When NEXT is selected, an edit document request URL, given above, is sent from browser 101 (because, in this example, NEXT refers to a previously created document). In response, edit document handler 166 opens document 225, form/scene loader selects scene C 227, HTML generator 179 generates html and sends it back to the browser 101 and scene 227 is there displayed.

Now browser is displaying scene C 227. The user enters information, such as name of document, text, etc. Scene C 227 presents to the user, for example, the actions of: publish, publish as, save, and cancel. Assuming the user selects publish, a scene is displayed asking for more information, such as where to put page, or the name of the room being created.

Handlers 165, 166, and 167 having now been described, and publishing methods, commands will be further explained. Commands get invoked for creating, deleting or changing QuickPlace objects. These commands include, as enumerated above, create, delete, update place, room, user or folder. Other commands include providing for changing security in a room.

Continuing with reference to FIG. 15, one cycle of command invocation, for create folder, is as follows:

user clicks on new when browser 101 is in scene A 224
new issues open form to bring scene B 226 to browser 101
user chooses create folder
user select next
QuickPlace 137 creates an empty folder document 225
server 137 returns scene C 227 to browser 101
which lets user choose the kind of folder to be created (various options are presented)

user selects folder type=standard list, and clicks on next
browser sends choice to folder type=standard list as a command argument, to be stored in a field in new document 225
server 137 sends back a next scene (not shown), asking for name of folder
user enters "draft letter" for name of folder
user select next to submit changes,
another scene is returned asking where
user answers, and selects next
animation is displayed at browser 101, and as browser is in transition from this last scene, a create folder command 229 is executed to create and store in database 230 the actual folder object, that uses characteristics specified in new document 225.

Alternatively, the user could have selected other options which would result in execution of other commands 229, such as create user, and so forth.

Room Security

Figure 10:
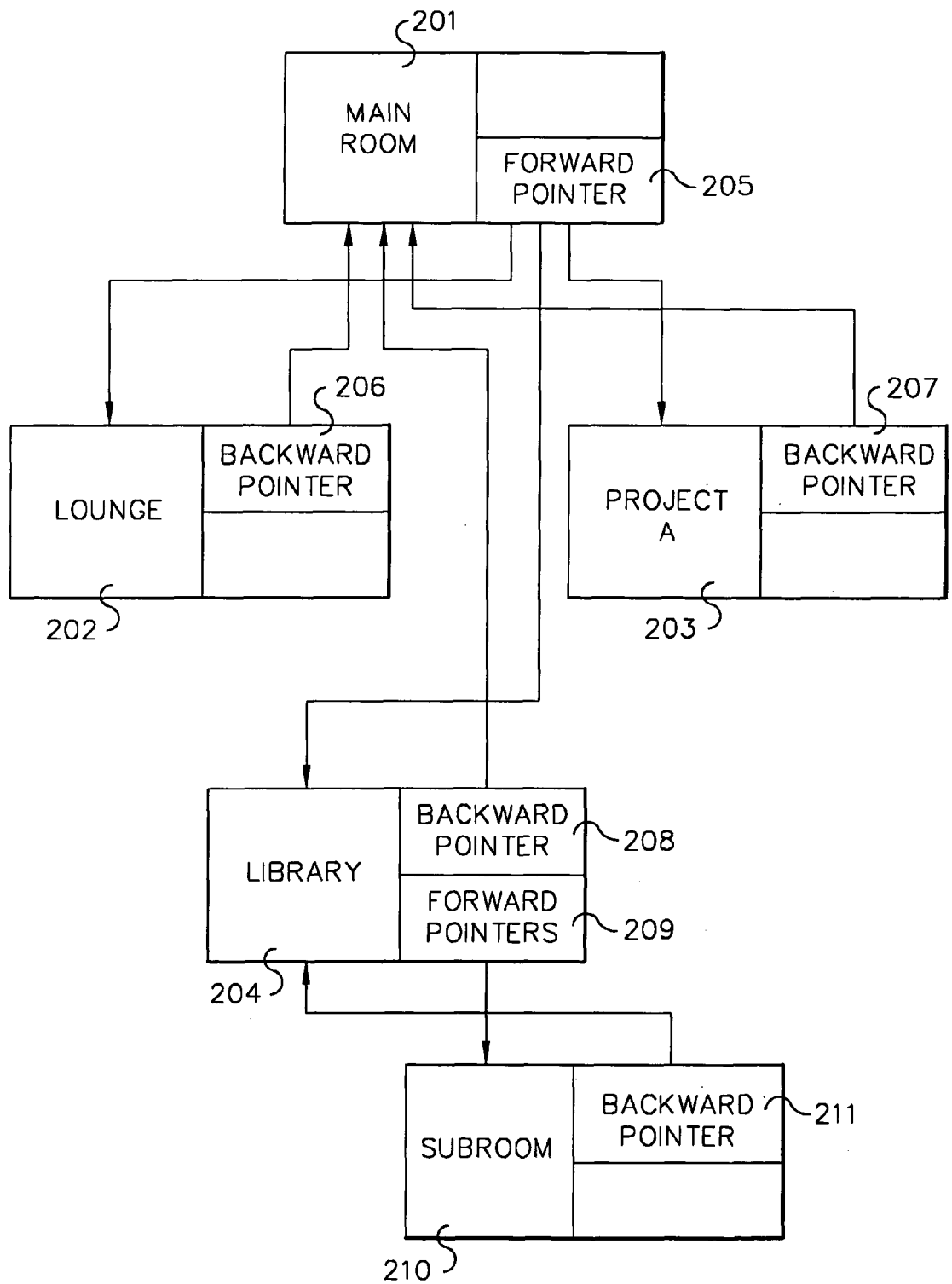
FIG. 10 is a diagram illustrating a hierarchical structure of rooms with room based security.

Referring to FIG. 10, QuickPlace rooms 201-204 and 210 are connected by forward and backward pointers 205-209 and 211, and these enable the security of each room to be independently managed. Each room has its own security; that is, the identity of each user allowed to enter the room and that users security level: the three levels being reader, author, manager. This is held in an access control list which is a part of each room. While an individual, say Steve, has reader access (R) to the library 204, he can have author (A) access to a subroom 211. This enables a subroom 211 to have increased/maintained, or decreased access authority for a particular individual with respect to its parent room 204. Only individuals with access to a parent 204 can access a subroom 210, but that subroom 210 can have changed access for the subroom 210 for these individuals. Previously, security could not be increased in subrooms 210 with respect to a parent room 204.

A database access control list (ACL) specifies who can or cannot access the database. For users who can access a database, access levels and roles determine the specific actions they can perform—for example, creating or deleting documents. Document access fields (Readers and Authors fields), in conjunction with the database ACL, control who can read or modify specific documents. Thus, to limit access to specific documents created from a form, a readers field is included. A readers field explicitly lists the users who can read documents created from the form. If a form has an access list, names from the readers field are added to the form access list. Otherwise, the readers field controls access to documents created from the form. Entries in a readers field cannot give a user more access than what is specified in the database access control list (ACL); they can only further restrict access. An authors field works in conjunction with author access in the database ACL. Listing users in an authors field expands access rights by allowing listed users to edit documents they create. Entries in an authors field cannot override the database access control list; they can only refine it. Authors fields affect only users who have author access to the database.

Figure 11:
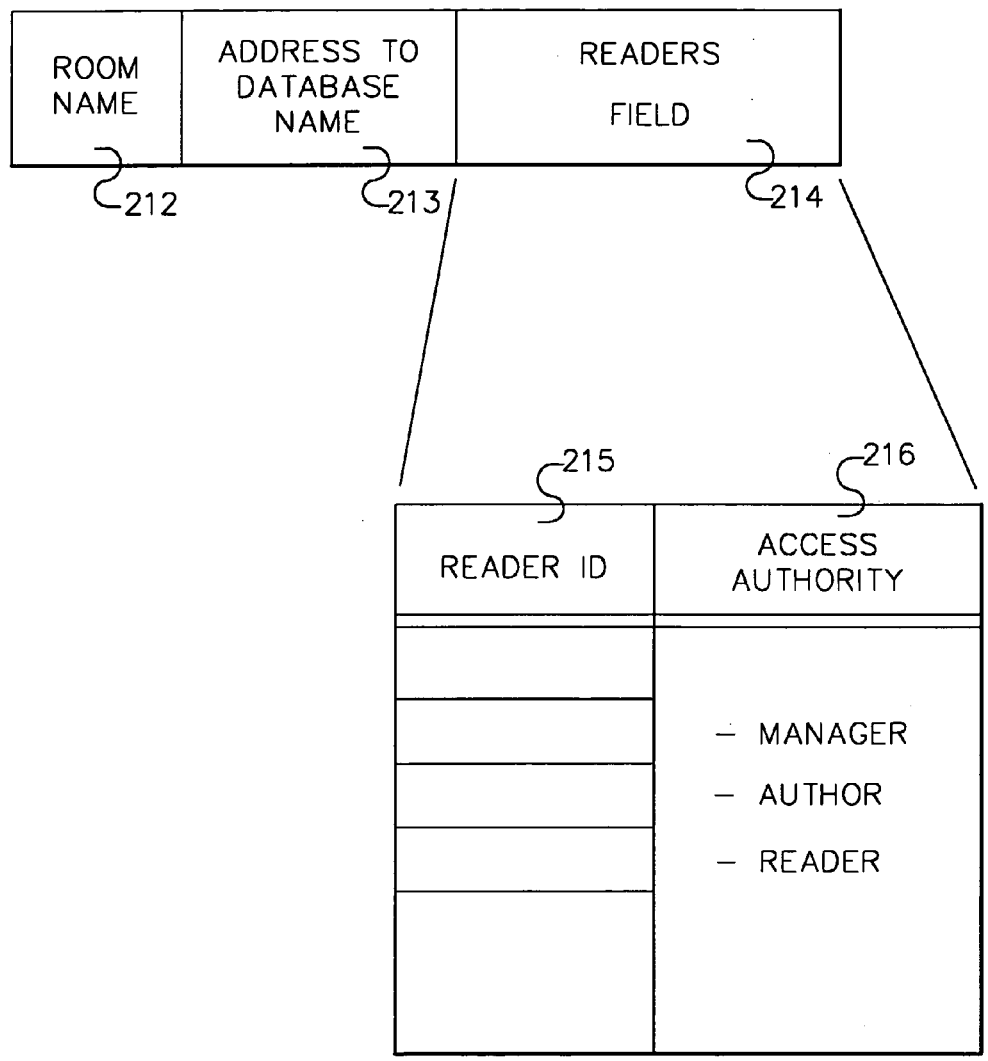
FIG. 11 is a diagram illustrating a forward pointer in a room from FIG. 10.

Referring to FIG. 11, forward pointers 205, 209 are secure. Security, in this context provides that forward pointer 205 to project A 203 carries the same security as that of project A 203, and anyone viewing main room 201 who is not entitled to access project A 203 will not see room 203 listed in parent room. QuickPlace does not show a user things or objects to which the user does not have access. In past, such objects were shown, but were greyed out or otherwise managed so that user access was inhibited. Forward pointers, therefore, include room name field 212, address to database name field 213, and readers field 214, which includes a table of user identifiers 215 for each user permitted to access the room, with corresponding access authority 216 for each such user, which may be manager, author, or reader.

Room Modification from Browser

Figure 12:
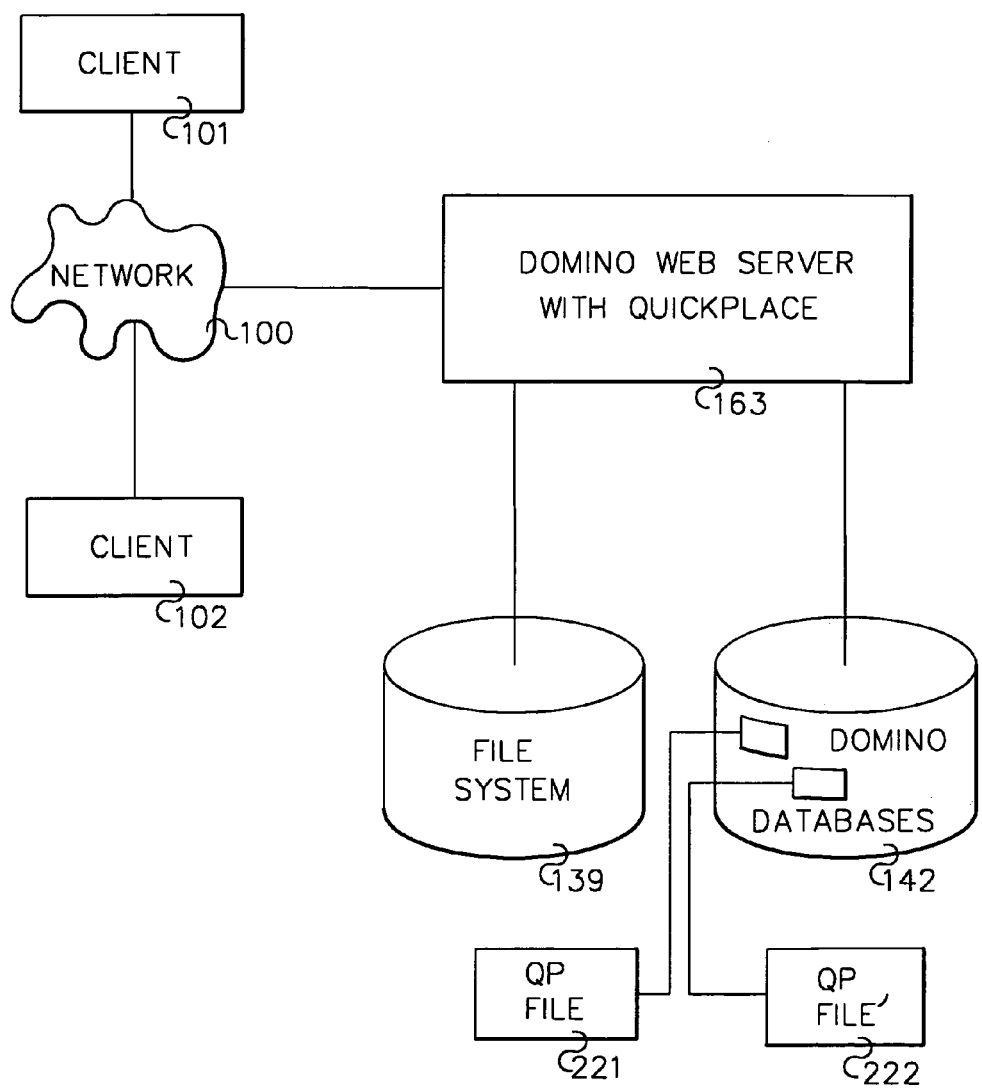
FIG. 12 is a system diagram illustrating file updating.

Referring to FIG. 12 if a user client 101 wants to modify the QuickPlace database 142 file 221, then QP server 163 creates a new qpfile' 222 for client 101 to change without bothering user client 102 who may still be accessing the qpfile 221. Once done, qpfile' 222 replaces qpfile 221.

Figure 13:
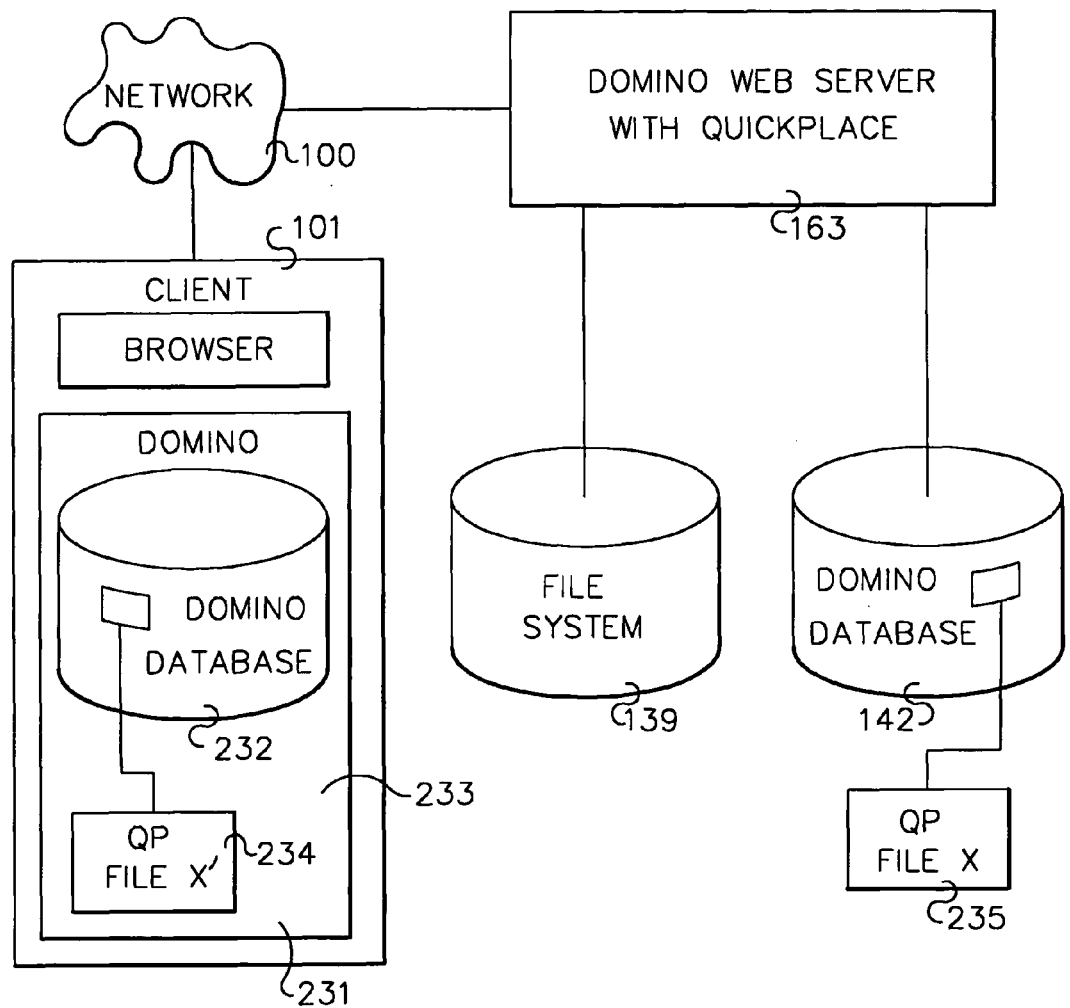
FIG. 13 is a system diagram of the collaboration system of the invention.

Referring to FIG. 13, a qpfilex 235 resides in database 142. A browser on client computer 101 accesses a file system 232 on the PC which is a replica 234 of qpfilex within a replica 233 of Domino web server 163 (or at least a portion of it) on it as well. In this manner, client 101 has the necessary function locally to do off line browsing, changing qpfilex 235 with new data, new rooms, etc. to create qpfilex' 234. When done, client 101 with network 100 access replicates file qpfilex' 234 to the main site to replace qpfilex 235 with qpfilex' 234.

Figure 6:
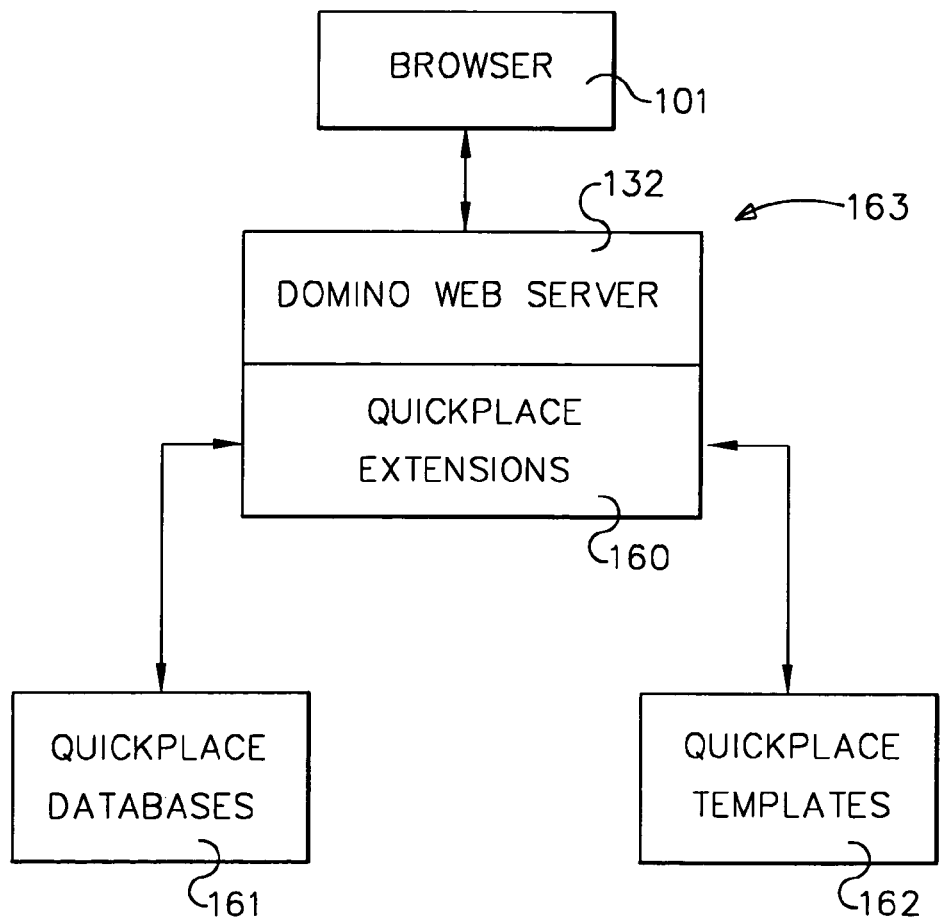
FIG. 6 is a system diagram illustrating QuickPlace server databases and templates.

Referring to FIG. 6, the QuickPlace system includes browser 101, QuickPlace databases 161 and QuickPlace templates 162. Mediating the conversation between the browser and the databases and templates is a Domino web server 132 with QuickPlace extensions 160. Templates 162 contain HTML and Java Script and controls and page generation language. Databases 161 stores common resources, sign elements, and client components including rich text aesthetic control, and applet control which enables server and client desktop integration and offline control. With respect to offline control, with a QuickPlace created on a server, the offline feature allows replication, or installation of that place on a user's local computer, the purpose of which is to allow the user to work disconnected. Sometimes, disconnected work will be faster than accessing the server, depending on the network bandwidth.

Object Model

Figure 7:
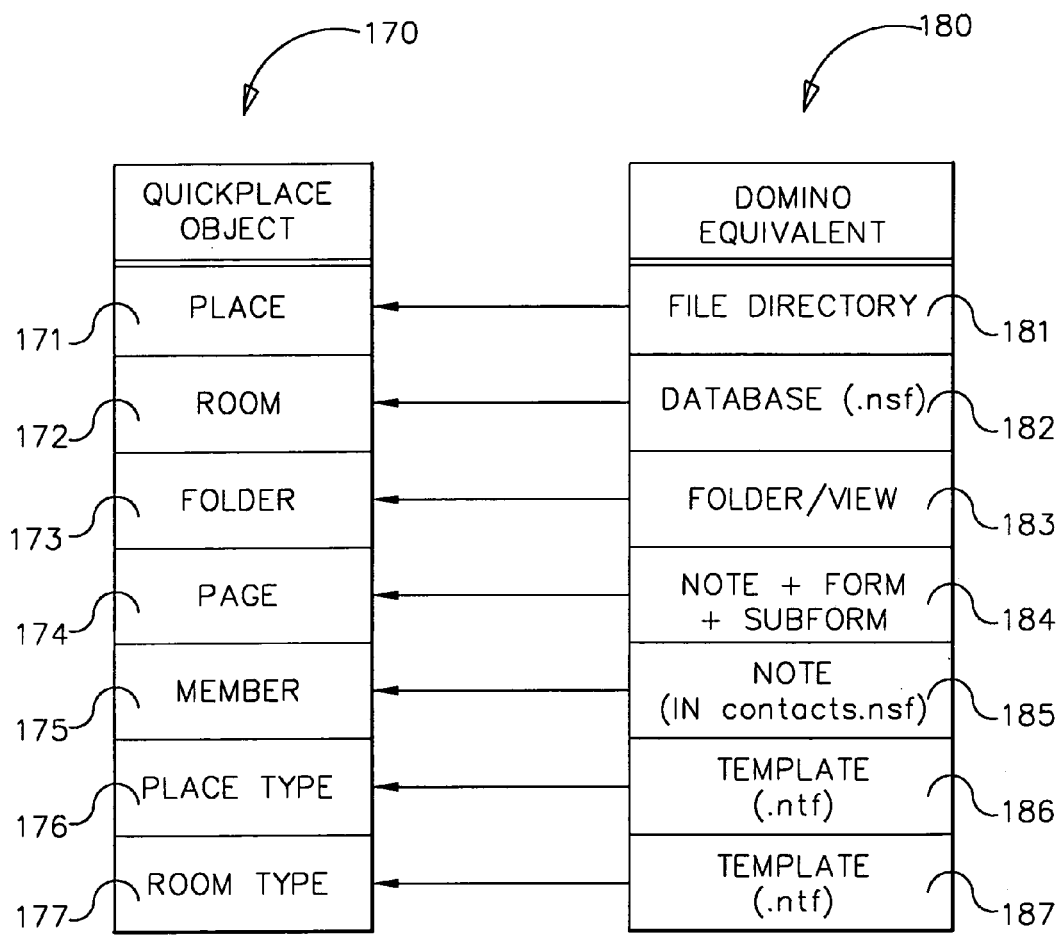
FIG. 7 is a diagram illustrating QuickPlace objects.

Referring to FIG. 7, the QuickPlace object model 170 is described, together with the Domino equivalent 180. Place 171 consists of rooms 172. A room 172 is made up of pages 174. Folders 173 are used to organize pages. Members 175 belong to rooms, and are those users authorized to access them. Place type 176 controls the creation of a place, including how many rooms it has, for example. Room type 177 controls the appearance and content of rooms. This simple object model is implemented using equivalent Domino objects 180. A place 171 is the QuickPlace site, organizes pages in rooms and folders; it is a simple file directory 181 containing rooms 172. A folder is an organizing structure for collecting and displaying related pages in a site. Each room 172 is a database 182, a collection of pages with discrete security and authentication. This enables access control properties to be carried from the database 182 over to the room 172, enabling places 171 on a database to grow. QuickPlace folders 173 are implemented as folders 183, and sometimes as views in the background for collecting documents and for saving a stored query. A QuickPlace page 174 may be interpreted as a data note 184, the combination of a data note, a form, and one or more subforms, and is also referred to as a document. Subforms control the way that the page is viewed and the user interface. A form manages the display of data notes. A form can contain fields for containing data and employ scripts to process and compute data. A page is the basic vehicle for content. Content is created using the QuickPlace editor or importing content from an external source. A member 175 is also a data note, and each place contains its own member directory. A member note contains information about a tem member of a QuickPlace. In addition to this data, the member must be listed in the ACL of main.nsf and names.nsf to pass authentication. Place type 176 and room type 177 are implemented as Notes templates 186, 187, respectively. A place type 176 provides the structure and design for the resulting place. A room type 187 provides the structure and design for the resulting room.

A database 182 is a container for data, logic, and design elements in an application. Design elements are building blocks used to create an application, and include pages, forms, outlines, navigators, views, folders, framesets, shared resources and agents. Domino databases have the file extension .nsf.

A folder 183 is a container used to store related pages (documents) or groupings of pages (documents). Herein, pages and documents sometimes used as equivalent, and in other contexts a document is created by a server from a page submitted from a browser. Folders have the same design elements as views, and are created in much the same way as views, using the Create-Design-Folder command. The difference between folders and views is that views always have a document selection formula that collects and displays documents automatically. A folder remains empty until users or programs add documents to the folder.

A form, like a page, displays information, but unlike a page is also used to collect information. A form provides the structure for creating and displaying documents, and documents are the design element that store data in a database. When a user fills out the information in a form and saves it, the information is saved in a document. When a user opens the document, the document uses the form as a template to provide the structure for displaying the data.

A template is a file that contains the structure for a database—that is, pages, forms, and views—but does not contain documents. It is a skeleton that contains design elements, but no documents. Documents have .ntf as their file extension.

Place Creation and Modification

Referring to FIG. 8, a place 191 is created. A place type 190 in its basic form is two databases, one that describes the room type 192, in this case, a meeting room; and the other that describes the member directory 194 for that place. A place 191 is created by copying both templates 192, 194 into a database. The top level room 193 of every place is called Main.nsf for ease of access and contact.nsf is the member directory for that given place.

A QuickPlace is created by creating two databases from database templates. The Main.nsf is created from a MeetingRoom.ntf template, and is the parent database in a QuickPlace—all other databases in a QuickPlace are children of Main.nsf. Contacts1.nsf is created from the Contacts.ntf template.

A room is created from a default room type template, PageLibrary.ntf, which provides indexing infrastructure for maintaining the pages in a room, and also security and authentication features so that access to a room can be limited to a subset of team members. The database created from the PageLibrary template is assigned a unique name by the system to allow for multiple rooms within a QuickPlace.

When a QuickPlace server is installed on a computer, a QuickPlace directory is created under the domino server data directory. This QuickPlace directory includes several objects of interest including an Error types subdirectory and a page library subroom with unique name. Names for these objects are created to be unique because of the offline feature. Many users could be creating rooms, not on the server, on their own computers. And when these replicate off of the server, they could collide by name unless some uniqueness is guaranteed.

Server Extensions

Referring again to FIG. 6, eight QuickPlace extensions 160 are enhancements made to the Domino web server 132 in order to support a QuickPlace application. These extensions 160 are enabled only for QuickPlace URLS; that is, they are enabled for URLs that are targeted against a particular QuickPlace. These extensions are: (1) shared design elements, (2) database linkage, (3) commands, (4) publish and draft model, (5) security and authentication, (6) forms and fields, (7) decoration model), and (8) graphics server.

(1) Shared design elements are shared forms stored in a common template. These elements are provided to deal with the situation where databases are created with duplicate forms and subforms. To avoid having all of many forms would be duplicated with every room, they are gathered together in a common template, referred to as a head group common forms. As a result, databases are smaller since they don't have all these assigned elements. And because they're smaller, they can be retrieved and served faster and enable efficient server site caching.

(2) Database linkage enables the grouping of a number of databases in a hierarchical way. A place is a collection of databases, and these need to be represented in a parent child relationship. Data notes represent the hierarchy to the database. There is a data note in the parent database, and there is a data note in the child database. The use of data notes for these QuickPlace extensions as a way of representing their functionality has the benefit that there are many ways of manipulating them, whether it's with Java or forms or the Notes designer.

(3) Commands are representations of the methods that operate on QuickPlace objects 170. They can create, modify and destroy them. Examples are create place, create room, create user, modify user, and so forth. When a user interacts with a user interface (browser), he submit a form to the server. When a form is submitted, the server detects a named command item in that form, extracts from the form any additional arguments, and then performs the command, such as, for example, create a user in the particular member directory. In this way, QuickPlace functionality is encapsulated into a well-defined set of commands.

QuickPlace commands are set forth in Table 1, and the fields of QuickPlace objects are set forth in Table 2.

(4) The Publish and draft model extension allows management of two versions of a page: published and draft. Each time a copy of a published page is to be edited, a draft copy is made and used. A link between the draft and the published versions is achieved by having the draft point to the published copy and the published copy point to the draft. When a draft copy is made, an author field is provided in the published copy to prevent other people from editing what is currently undergoing revision. The reader field in the draft copy is dropped, thus preventing others from seeing the draft copy revisions before it is published. When the draft is ready to be published, the information from the draft is put it over into the publish copy and the draft discarded. The benefits of this extension is a user may enjoy private revision of pages at his site, his places, independent without being visited by other users. While a user is working on a private copy of a page, the public, or published, version is made available to anybody that visits. This is also the basis for check out functionality, by which a user working on a document has it checked out, preventing others from working on it. This is also the basis for work flow: as page drafts move between reviewers, the readers and authors fields on the draft are manipulated to selectively enable and inhibit access or modification. Once a draft page is approved, then it becomes published.

(5) The security and authentication QuickPlace extension is consistent with the QuickPlace model, which provides three levels of security or roles: reader, author, and manager. There exists a member directory for each place. What this means is that each place has its own set of members that visit it. The Domino server is modified to perform local authentication against that directory, making places very portable, self-contained. And they don't collide with other members in other places. A user, having control of his own place member directory, set his own security for access to that directory.

(6) The forms and fields QuickPlace extensions control the content and formatting of pages. They're very fundamental. They're also implemented as data notes, and because they're data notes, they allow for easy customization.

(7) The decoration model extension allows user control over the customization of rooms and places. Place and room properties and aesthetics including look and feel are stored in notes, main.nsf. Also, there is a shared graphics resource database that controls all the graphics that are shared by all of the rooms. As a consequence data notes and databases are easily extended and customizable.

(8) The graphic service extension transforms text, font, and effects into an image through server side rendering. This us URL driven, and allows rich text formatting independent of browser capabilities. That is, regardless of the capabilities of the client, because text, font and effects are rendered at the server, universally acceptable jiff may be served. This is done through the command Get Image, which includes arguments specifying the text that to be transformed, and the desired colors, font name, sizes, and animation (that is, undulation), shadow color, and so forth.

File Upload by Drag and Drop

Figure 16:
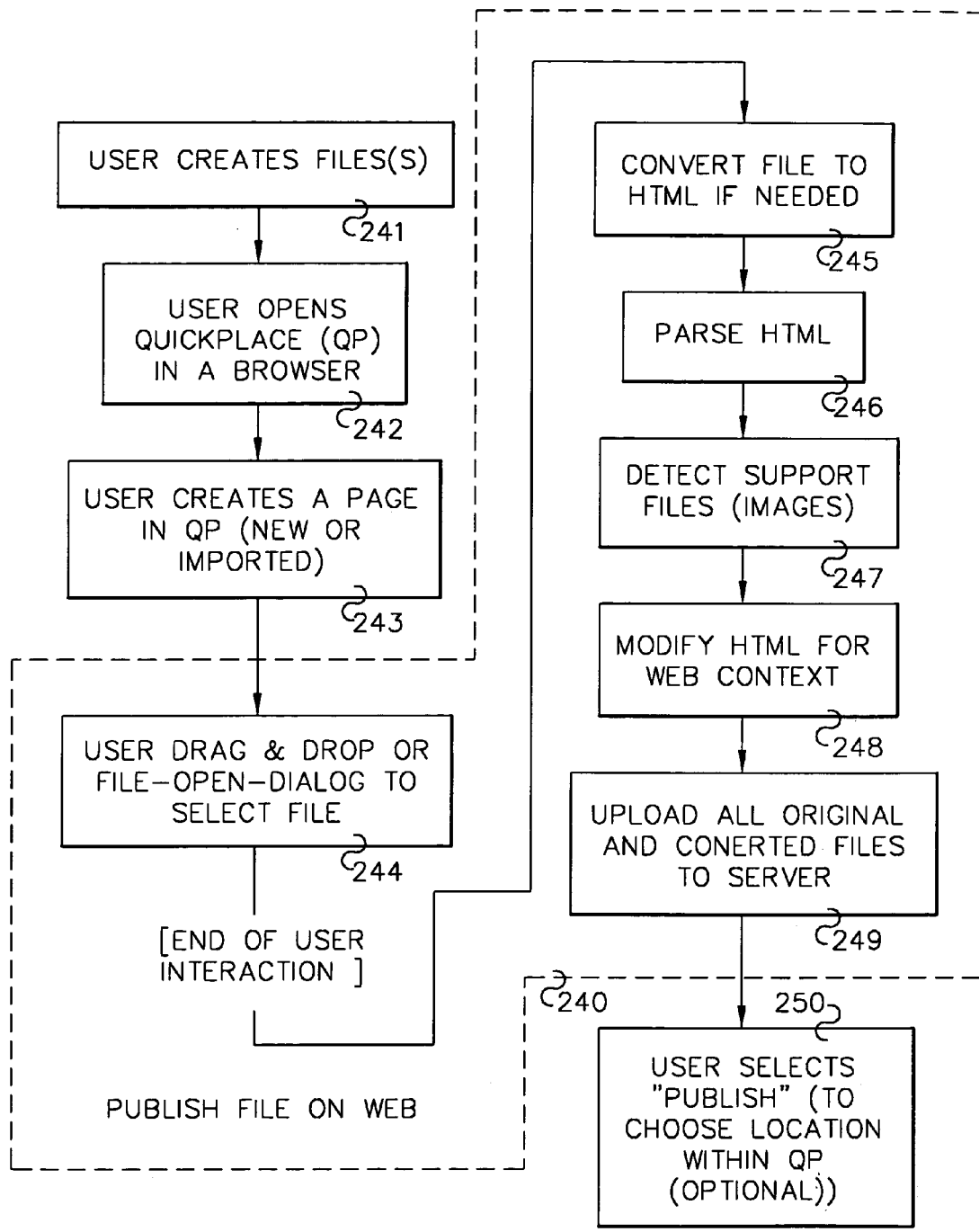
FIG. 16 is a flow diagram of a method for publishing a file on the Web.

Referring to FIG. 16, the method of the invention for dragging and dropping files is shown. Responsive to a user dragging and dropping one or more files, a client or a server is operable for converting the files to HTML, detecting support files by parsing the HTML, uploading all of the files to a web server, and modifying the HTML files to display the content of the files in a web context, thereby enabling the author or other users to modify the original files. This process is accomplished without having to open file, and requires no manual conversion to HTML. User is in a desired, familiar place, site, or context where he doesn't need to figure out file names. We provide speed, ease of use. Dragging and dropping a non HTML file into a browser which is presented to users as HTML and presented to others for editing as non-HTML is fundamentally easier than a process requiring the two steps of the user of opening a file application and saving the file as HTML. Also, with QuickPlace, the user drags the document to be copied into the spot in the site where it is to be rendered. In other systems, a user has to deal with directories and file trees which may not be so intuitive for the user as to where the document should go.

In accordance with the invention uploading/downloading drag/drop of MS Word documents, Excel documents, and Power Point presentations, and the like, is accomplished in a way that the data is simultaneously presented as HTML to users yet preserved in its original file format for future editing through a web browser. A file is taken by a browser and dragged into an area on a form; readers will see an HTML version of that file yet the author, when editing, will still have word file to edit. Author sees the file in its original syntax, every else sees it as HTML, and this through a browser. In Power Point, the user is provided an interface allowing HTML reader to cycle through the pages (of a slide show). To do this, HTML and HTML control for toggling are generated. Both the file and its navigation controls are converted to HTML. In addition, all references to images are found, converted and uploaded automatically. To show a document including a picture to others on the web, text is converted to HTML, and the image is converted into a .gif file. Both files are then uploaded to the server, which makes sure that the HTML that URL references the image points to the correct place in the new storage location at the server. The user performs the steps of creating the page, dragging and dropping the page, and publishing it. The system (client and server) automatically performs the remaining steps.

Referring to FIG. 16, in step 241 the user creates the files and in step 242 opens QuickPlace in a browser. In step 243 the user creates a page in QuickPlace (either new or imported) and in step 244 drags and drops the file or uses the file-open-dialog command to select the file. This ends the user interaction, and the system takes over. In step 245 the system converts the file to HTML if required, and in step 246 parses the HTML to find, in step 247, if any images or other support files are present. In step 248 the HTML is modified for web context, and in step 249 the original and converted files are uploaded to the server. The user may, in step 250, select publish to choose the location (room) within QuickPlace for publishing the file.

Room Navigation

Figure 17:
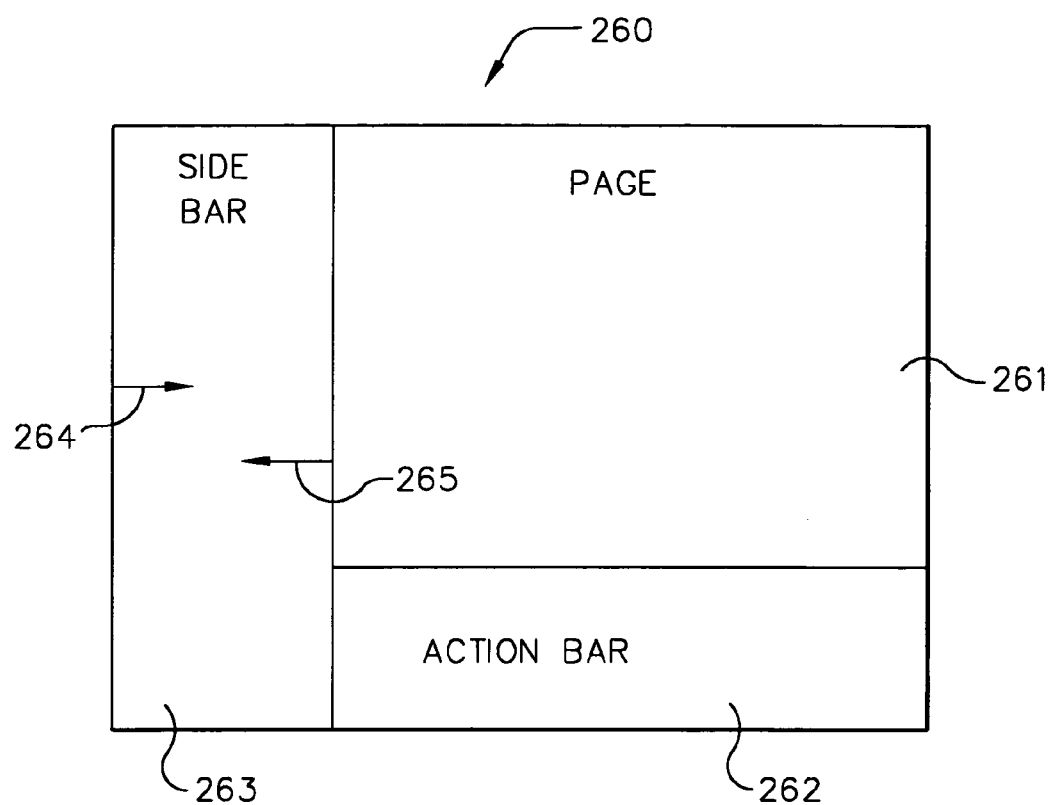
FIG. 17 illustrates a QuickPlace user room browser display.
Figure 18:
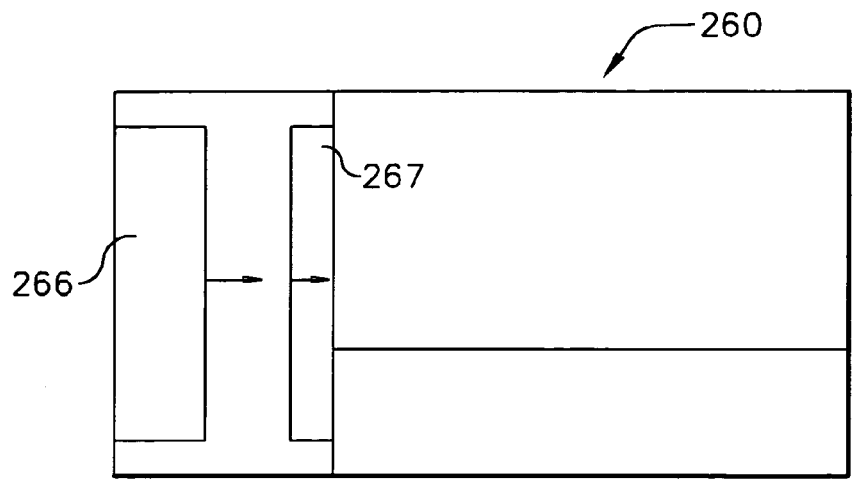
FIGS. 18, 19 and 20 illustrate the presentation of room navigation.
Figure 19:
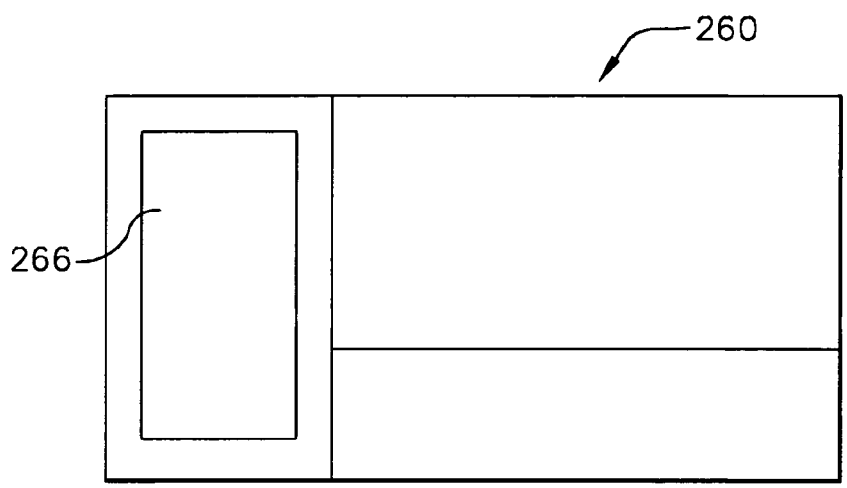
Figure 20:
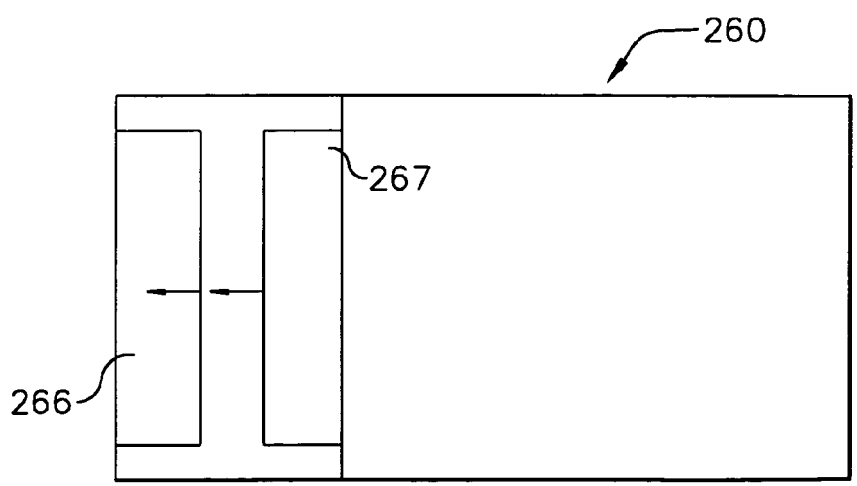

Referring to FIG. 17, a QuickPlace user room display includes side bar 263, page 261, and action bar 262. To visually indicate movement of page 261 from room to room, the material in side bar 264 slides in the direction of right arrow 264 to enter a room or left arrow 265 to leave it. Referring to FIGS. 18, 19 and 20, material 266 enters side bar from the left to show a new room display down the hierarchy is being entered and displayed in page 261; and material 267 moves to the left to enter side bar 263 as material 266 moves out to the left, indicating that the material in display 261 is changing to a room higher in the hierarchy, that is that display 261 is leaving a room. In this manner, the display projects to the user where he is at any particular time. To show leaving a room, the visual effect is to have the side bar move to the left while the side bar for the room being entered appears from the right.

Graphics and Aesthetics

Figure 21:
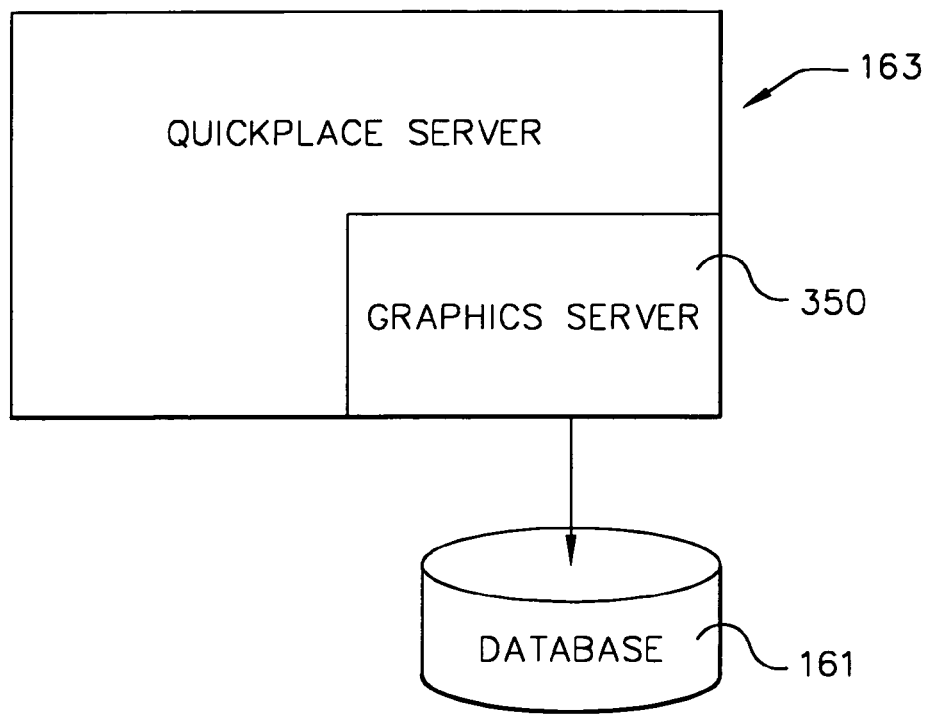
FIG. 21 illustrates a graphics server.

Referring to FIG. 21, QuickPlace server 163 includes a graphics server 350 connected to database 161.

Figure 22:
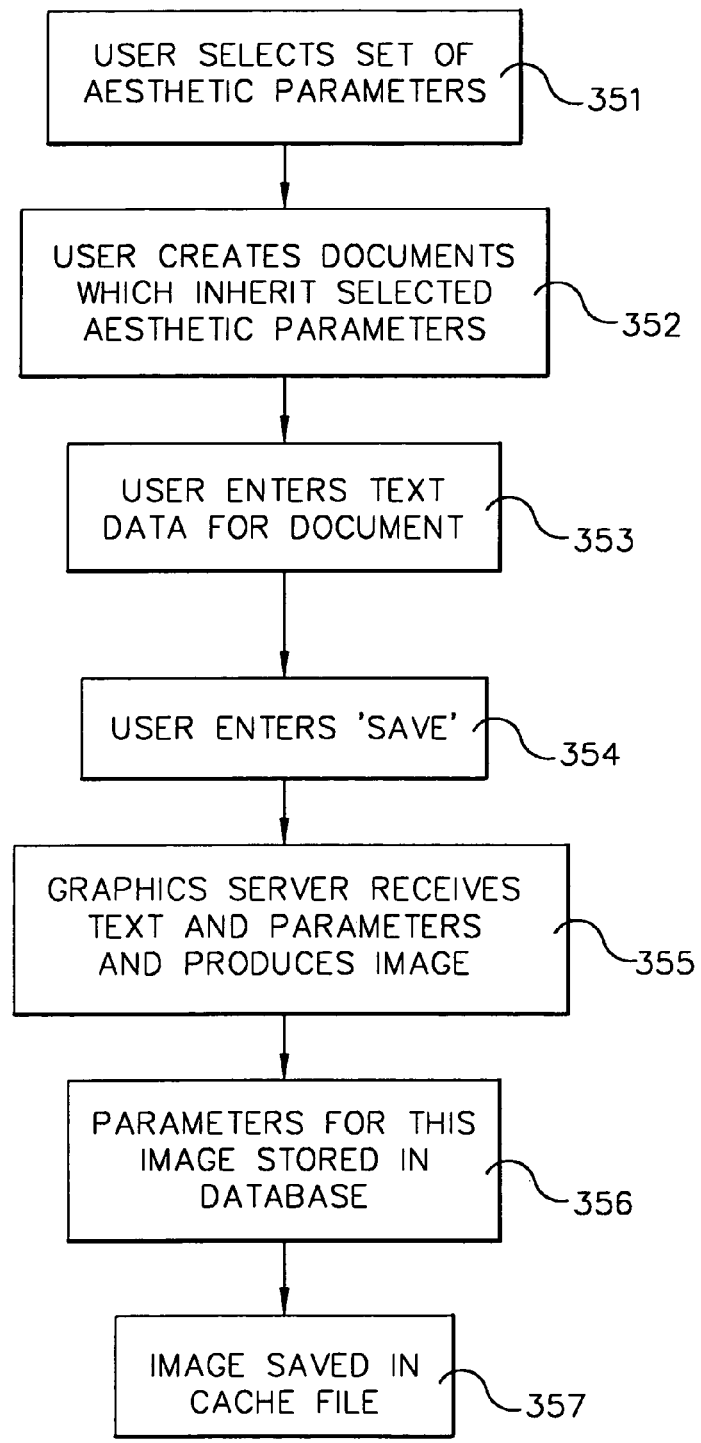
FIG. 22 is a flow diagram of the method for producing and caching web images.

Referring to FIG. 22, aesthetic support for a web site, such as QuickPlace, is provided as follows. In step 351, when a user selects QuickPlace, he also selects a theme, which includes set of aesthetic parameters for color, image, fonts type, and other effects. In step 352, the user creates documents which inherit the aesthetic parameters originally selected for this QuickPlace. If at some later time, the user changes the QuickPlace aesthetic parameters, these are propagated to all subsequently created documents. In step 353, the user enters text data for this document, and in step 354 selects 'save'. In response, in step 355 graphics server 350 saves the parameters and text as an image, in step 356 stores the parameters for this image in database 161, and stores the image itself in cache 153 (FIG. 3). This is managed by the graphics server 350. This process is particularly useful in an Internet environment, for people who access the QuickPlace can request via an URL parameter string a particular graphic which will be served to them by the graphics server. A graphics server generated image request is used by any user to make an image, and the graphics server responds by checking the cache and if it is found there, serves a saved image from the cache, and if not, generates it anew.

Figure 23:
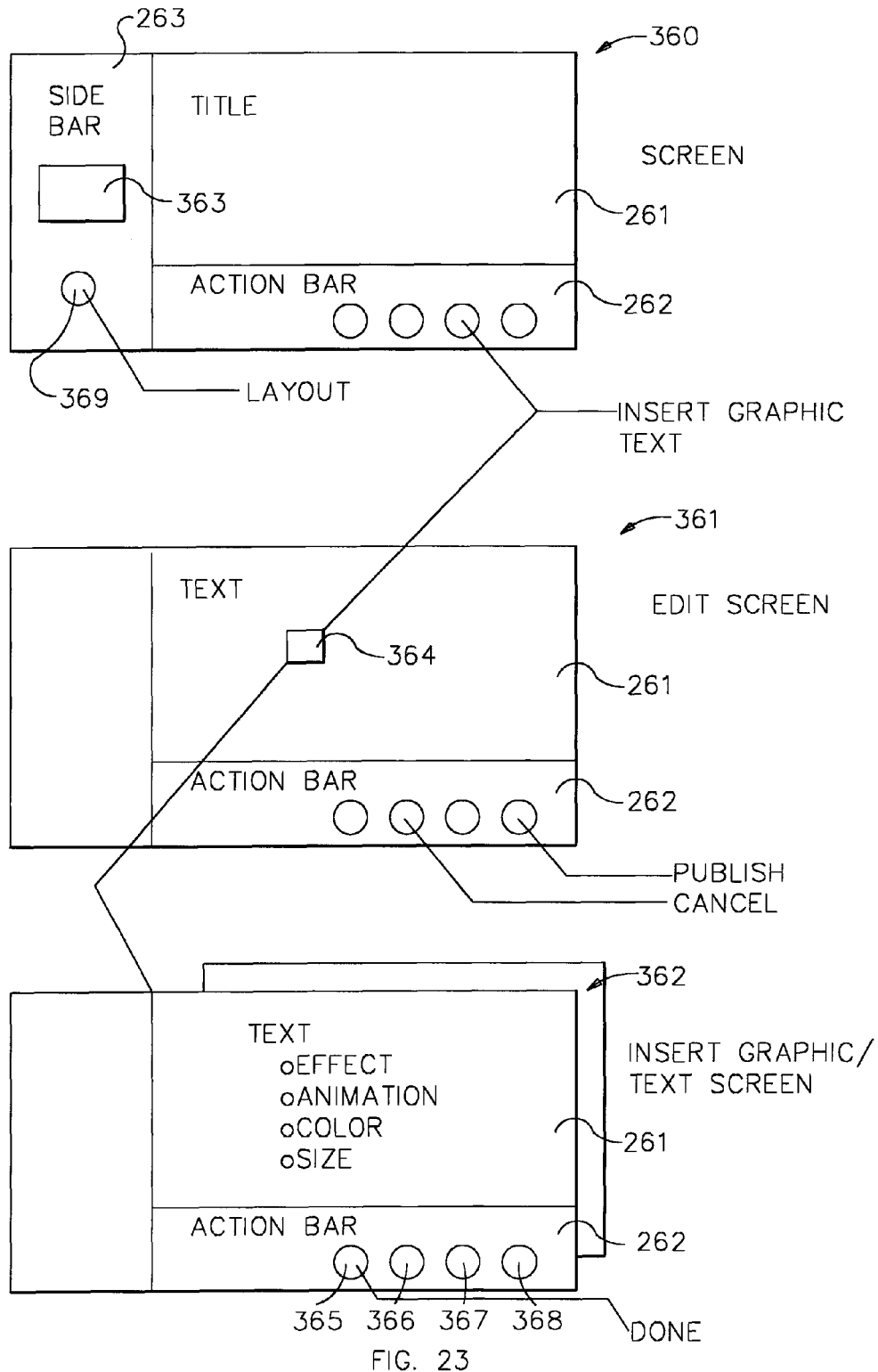
FIG. 23 is a diagram illustrating the insertion of graphic material into a text document.

Referring to FIG. 23, a series of panels 360-362 is illustrated showing how a document is published so that it appears as an item 363 in side bar 263 of a QuickPlace display 360. The user selects layout 369 and enters the title in work area 261. The QuickPlace program graphic server 350 puts the title in side bar 263 as a graphic 363, to compliment the aesthetic parameters of the QuickPlace. The user then enters text and selects appearance parameters in work area 261, and these are also generated as graphics which will be displayed in the read area 261 of the saved document.

Figure 24:
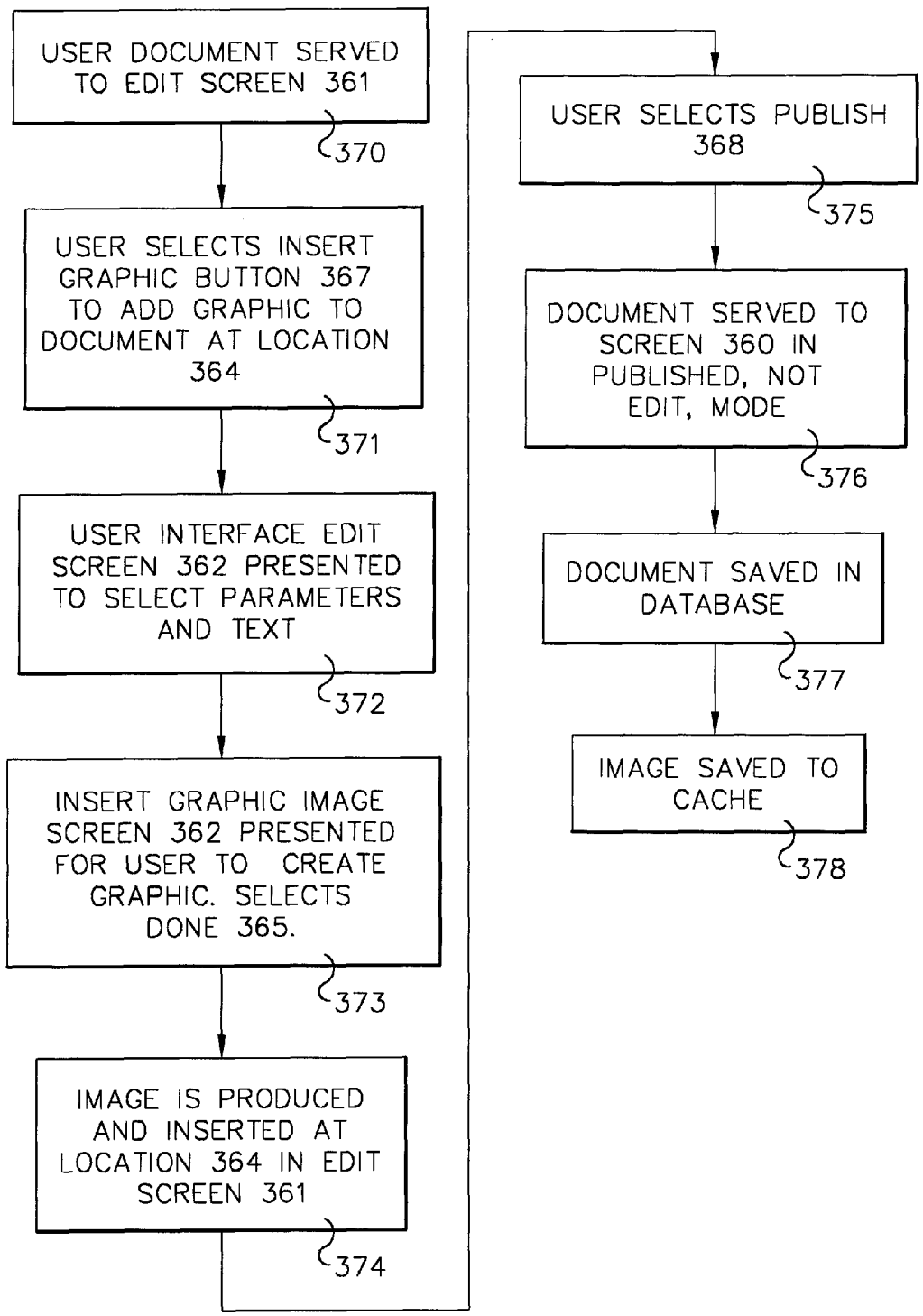
FIG. 24 is a flow diagram of the method for publishing and caching a document image with graphics.

Referring to FIG. 24, the process for generating a document including inserted graphics is as follows. In step 370, the user is served a document on edit screen 361. In step 371, with the cursor positioned at the point 364 in edit screen 361 where the graphic is to be inserted, the user selects insert graphic text button 367. In step 373, insert graphics screen 362 is presented to the user which includes a text area 261, and buttons and drop down menus for selecting various parameters, including effect, animation, color, size, and so forth. In step 374, when the user selects done 365, edit screen 361 is presented with the image appearing at the selected point 364. In step 375, the user selects publish 368. In response, the editor, which has the URL of the insert graphic text screen 361 that was used to generate the desired graphic, issues a request to graphic server 350 for that URL. The graphic server, in step 376 and responsive to request from the editor, either retrieves the previously generated image of the requested URL, or generates the graphic and serves it to the screen 360 in publish mode.

In steps 377 and 378, the image created is not saved in the document, but rather in the graphics server URL that generates the image. This is important: an image that is 1×2 inches may be 0.5 megabytes, and an URL is much less. Depending upon how often the image is used, it may be saved in the cache. Cache is managed by discarding images that are oldest, or some other cache management scheme, and if no longer in cache the image can be regenerated from the parameters stored at the URL.

To write software that makes images, a user would need to know or have access to C++, Java Script, or the like, and an understanding graphic file formats, including an understanding of what a URL is and how the Internet handles a URL request. References: (1) R. Fielding, et al. *HTTP Working Group Internet-Draft*, HYPERTEXT TRANSFER PROTOCOL—HTTP/1.1, <draft-ietf-HTTP-vll-spec-06>. (2) James D. Foley, et al. "Computer Graphics: Principles and Practice", Second Edition in C, Addison-Wesley Publishing Company, copyright 1996, 1990, ISBN 0-201-84840-6. 1175 pages.

Figure 25:
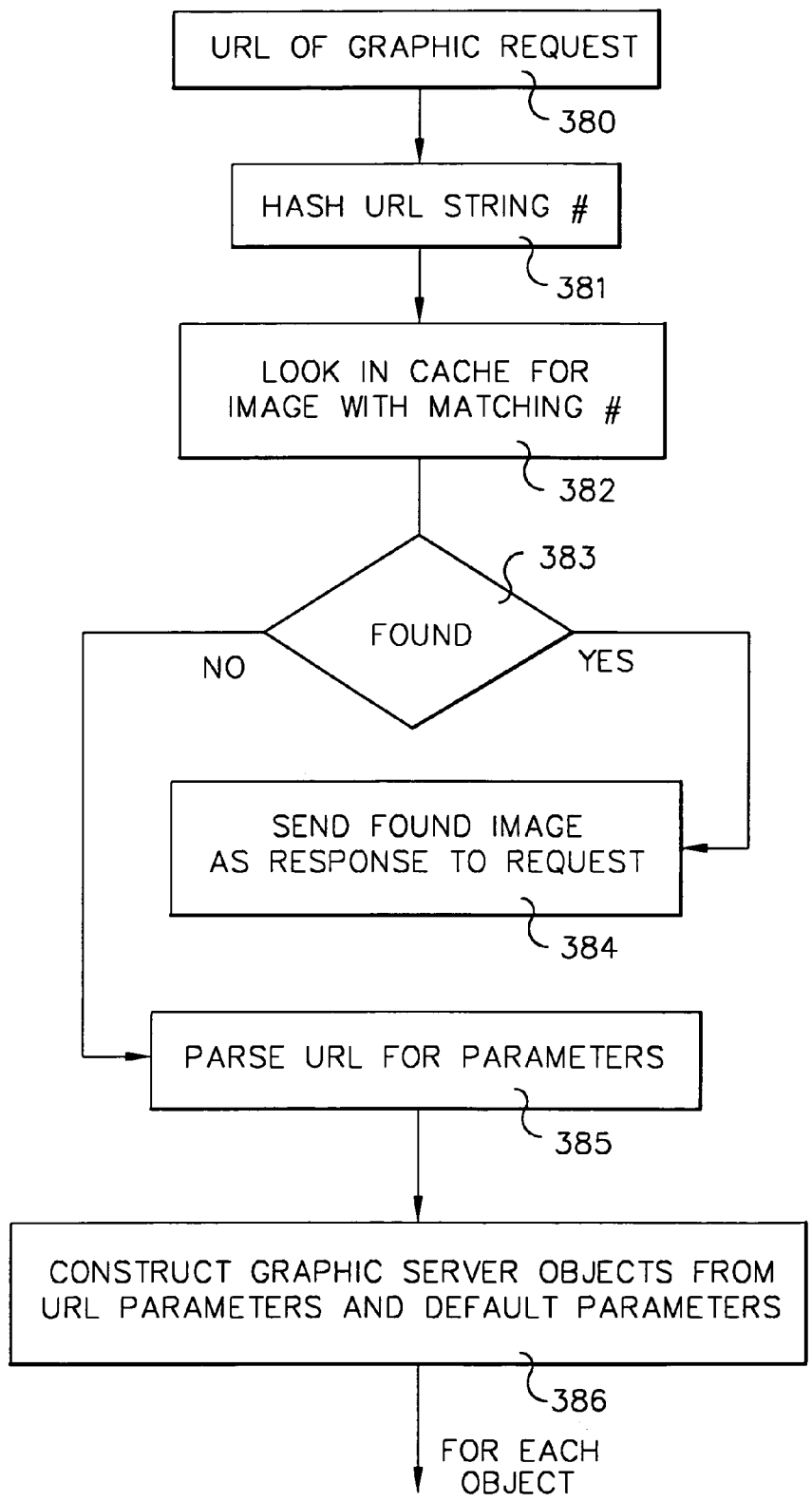
FIGS. 25 and 26 are a flow diagram of the method for serving an image from cache or construction.
Figure 26:
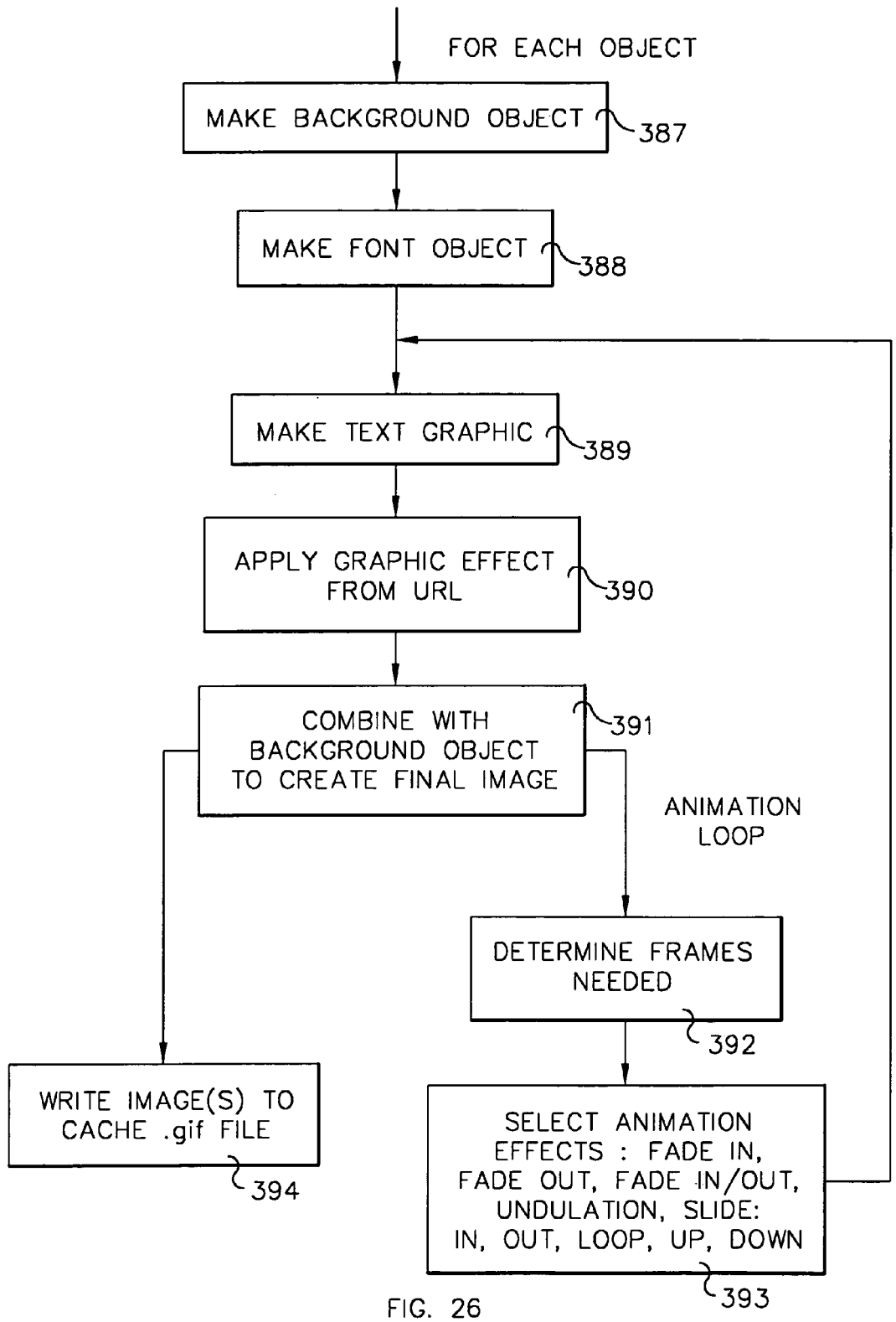

Referring to FIG. 25 and FIG. 26, graphics server 350 functions as follows. In step 380, the server receives the URL of a graphic request, such as from step 375 (FIG. 24). In step 381, the URL string is hashed to obtain a hash number that, in step 382, is used to look for an image in cache with a matching hash number. If, in step 383, that matching image is found, in step 384 the image is served in response to the request. However, if that matching image is not found, the image must be regenerated. In step 385, the URL from the request is parsed to obtain the graphic parameters which, in step 386, are used to construct the graphic server objects, using default parameters for any necessary parameters missing from the URL. Then, for each object constructed in step 386, in step 387 a background object is constructed, in step 388 the font object is constructed, in step 389 the text graphics are made, in step 390 graphic effects from the URL are applied, and in step 391 the background object is combined with the font, text, and effect objects to create the final image. Graphic effects include blurring, shadowing, transparency, etc. If animation is to be applied, in step 392 the number of frames required is determined, and in step 393 the animation effects selected. These include fade in, fade out, fade in/out, undulation, and slide. Slide includes in, out, loop, up and down. Undulation refers to transition between colors. For animation, a group of still pictures are created in a display sequence. Text is made graphic by creating an image of text and font objects with effects applied. Font objects are parameters that constitute selected font effects, including type, point size, color. A background object is the canvas on which document is painted or created.

Online/Offline Updating of Web Site

Uninterrupted online and offline updating of a web site is provided by QuickPlace such that other clients are not interrupted when a client is operating in draft mode. As was previously described with respect to FIGS. 14 and 15, a QuickPlace user may change a page by creating a draft copy when in edit mode, work with the draft copy, and save it without disturbing others who are using the original page. When finished, the user client publishes the draft page, which then replaces the original copy. Others viewing the original copy continue to use that original copy until they refresh, at which time they are served the newly published page. Normal conflict resolution may be provided.

Figure 27:
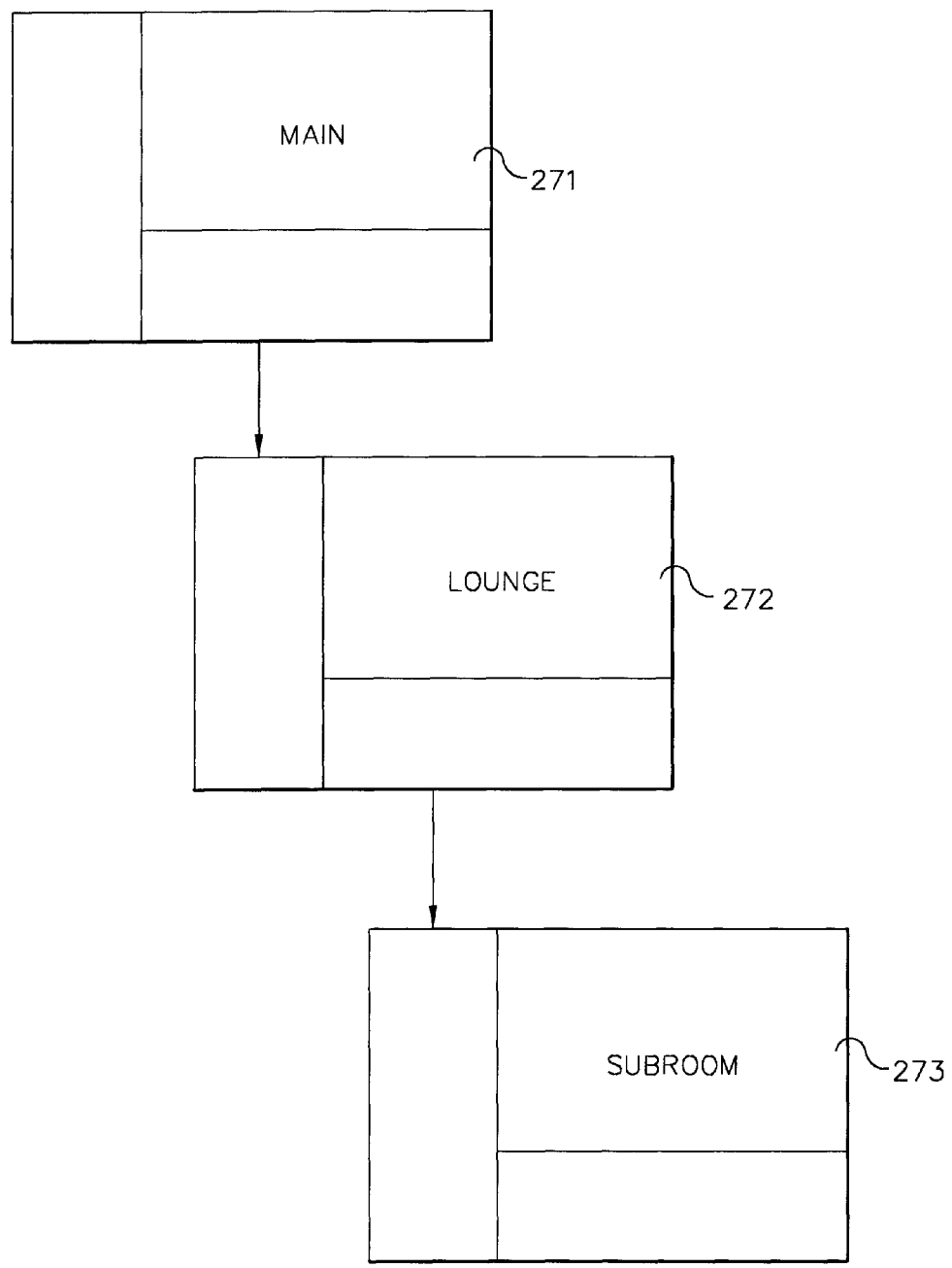
FIG. 27 illustrates a QuickPlace.

Referring to FIG. 27, a QuickPlace place, or object, includes one or more rooms, shown here as main room 271, lounge 272, and subroom 273, arranged in a hierarchical structure. In accordance with the preferred embodiment of the invention, interactive modification by way of a client browser of a such a site is allowed through the use of server side commands that respond to browser functions. These server side commands are QuickPlace commands 160 that are built on top of Dominos 132 (FIG. 6). For example, as will be more fully described hereafter, a create room command exists in QuickPlace.

Figure 28:
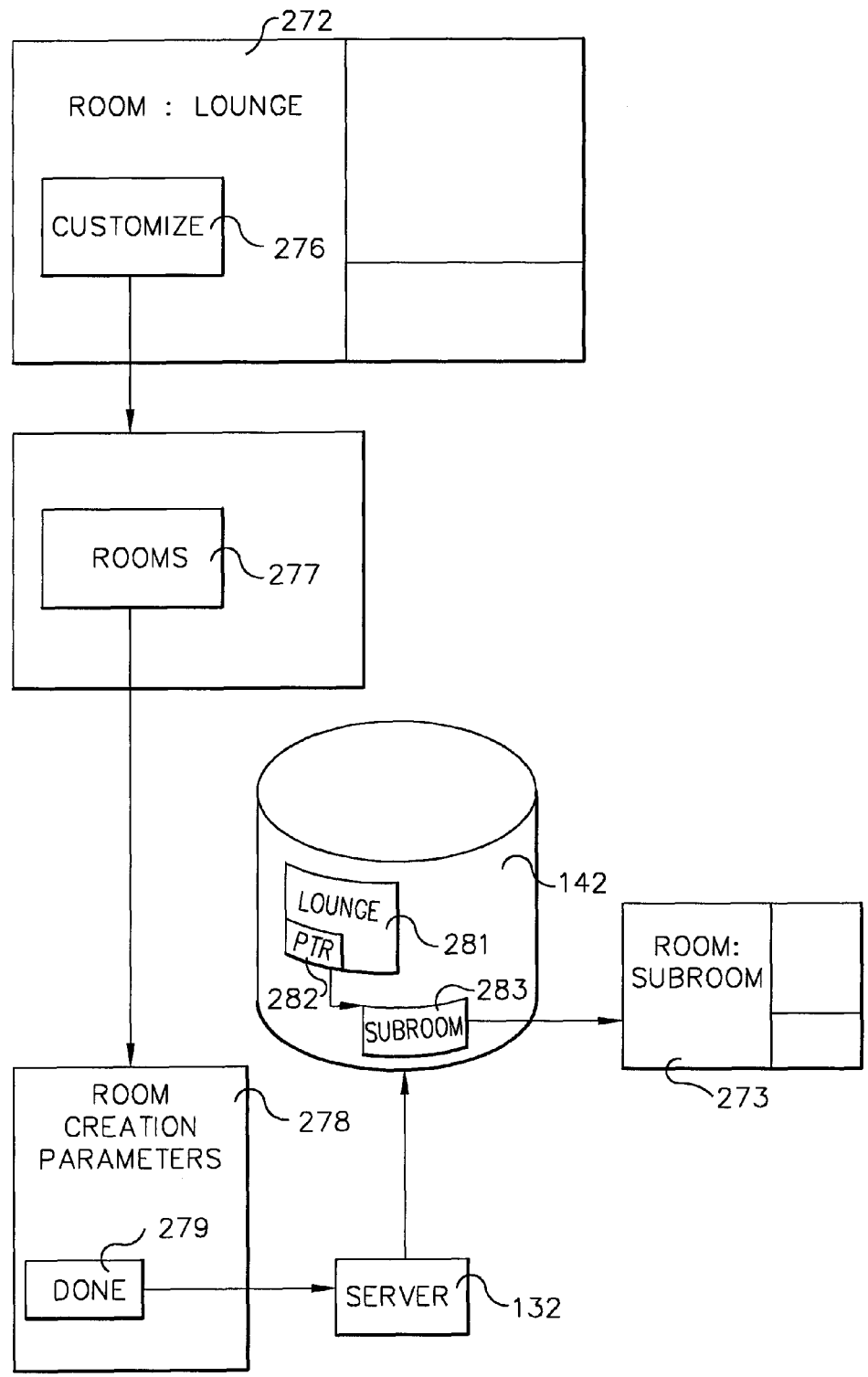
FIG. 28 illustrates the creation of a subroom.

Referring to FIG. 28, the manager of lounge room 272 creates subroom 273. To do so, the user selects the create room command as follows: he first selects 'customize' 276 in the side bar; this brings up another submenu including rooms 277 which, when selected bring up still another new screen 278 which includes parameters for creating room. Once those parameters are selected, the user clicks 'done'. In response, server side processing occurs. First, server 132 creates a subroom, which is another database 283, updates the forward pointer 282 to subroom 283 from lounge room database 281, with the user as manager and as only user. User may then goes into the display of subroom 273 to update the room description characteristics, and optionally add other users authorized to do the same.

Inheritance of Aesthetics

Figure 29:
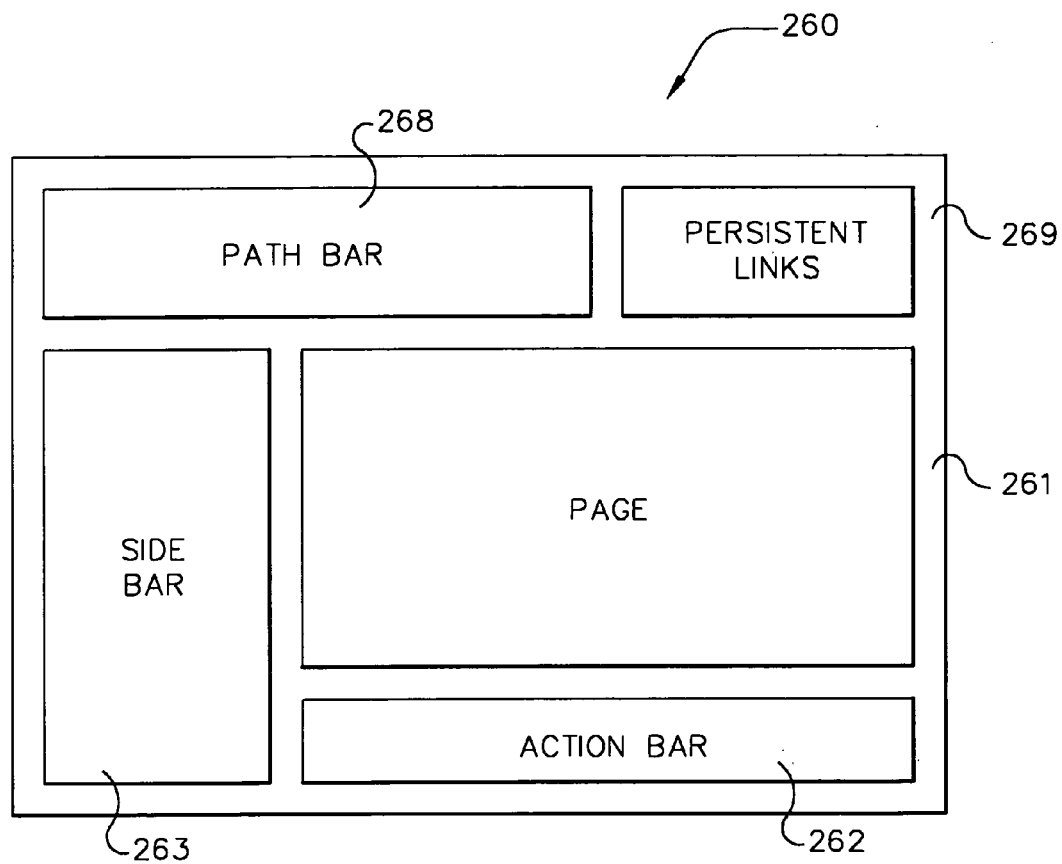
FIG. 29 illustrates the user interface to a QuickPlace room.
Figure 30:
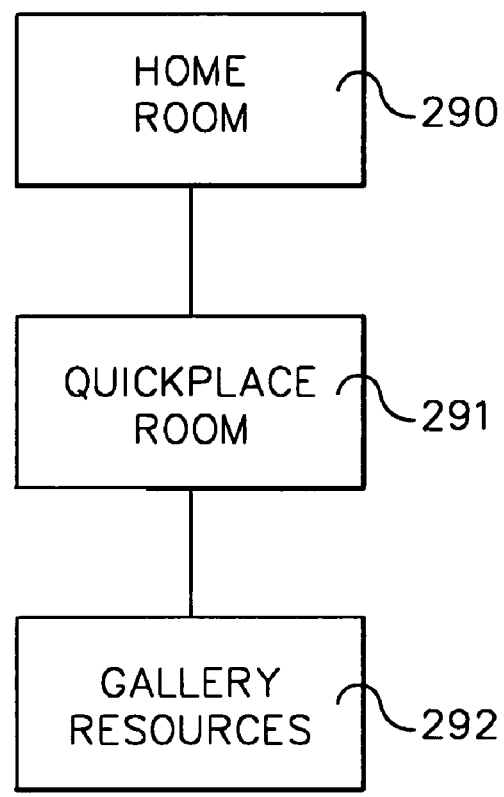
FIG. 30 illustrates a gallery resource.

Referring to FIG. 29, a QuickPlace manager of a room has flexibility in determining the aesthetics of the user interface 260 of that room. The manager, through the QuickPlace hierarchical inheritance feature, can decide that all subrooms of this room look a certain way. This is done by first changing this room, then all subrooms thereafter created from this room will inherit its aesthetics, and those subrooms previously created, but which have not had their aesthetics previously explicitly changed, will also inherit those changes. Once a subroom is explicitly changed, however, it no longer inherits changed aesthetic characteristics of its parent.

QuickPlace offers a preset gallery of web presentation formats, from which the manager of room can choose and then modify the one he chooses. A room 260 presentation includes a page, or work area, 261, an action bar 262, a side bar 263, a path bar 268, and persistent links 269. In accordance with an aspect of the invention, a user may upload a user configuration specification by which the design and appearance of a room presentation may be modified.

Figure 31:
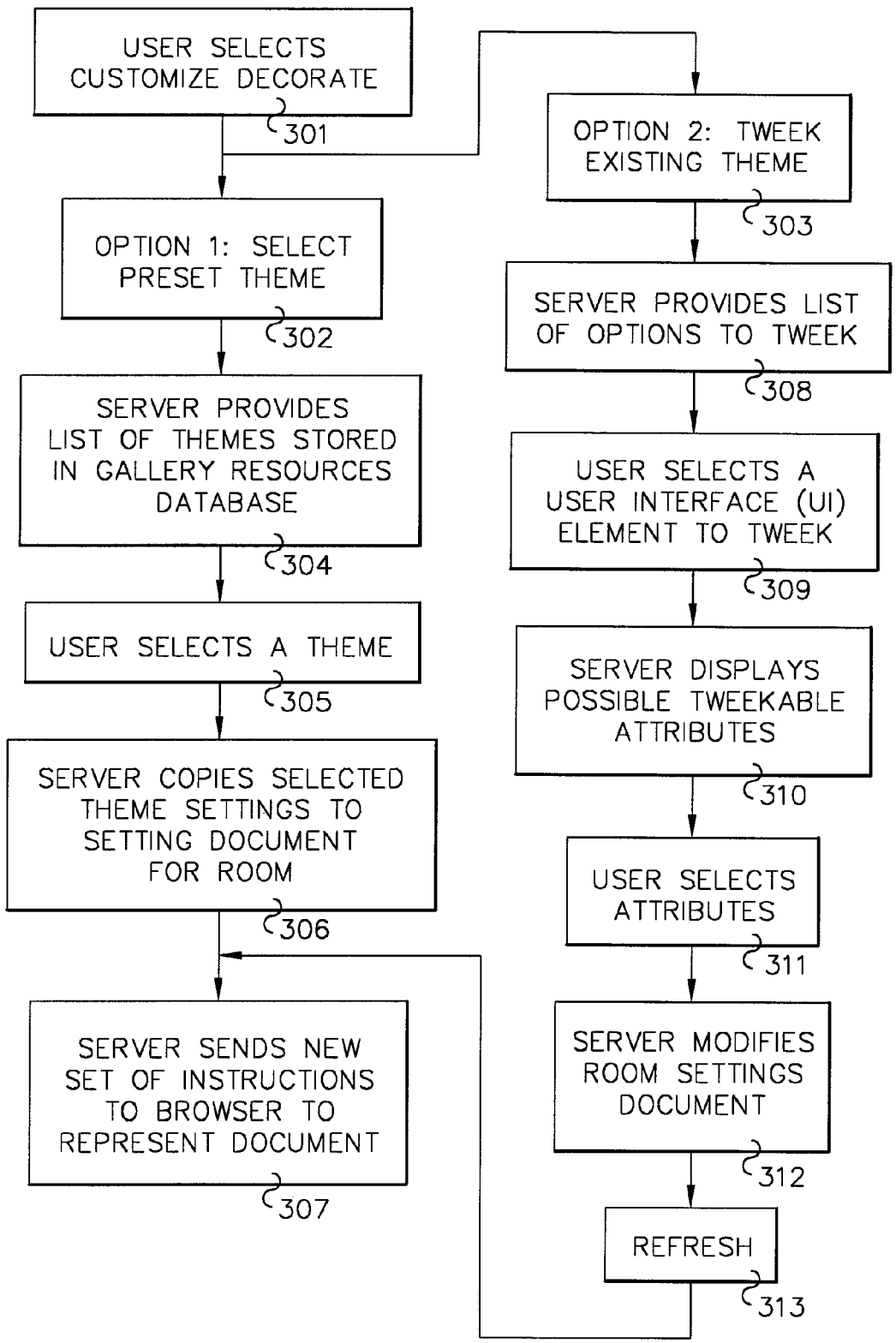
FIG. 31 illustrates a method for selecting or tweaking a room decoration.
Figure 32:
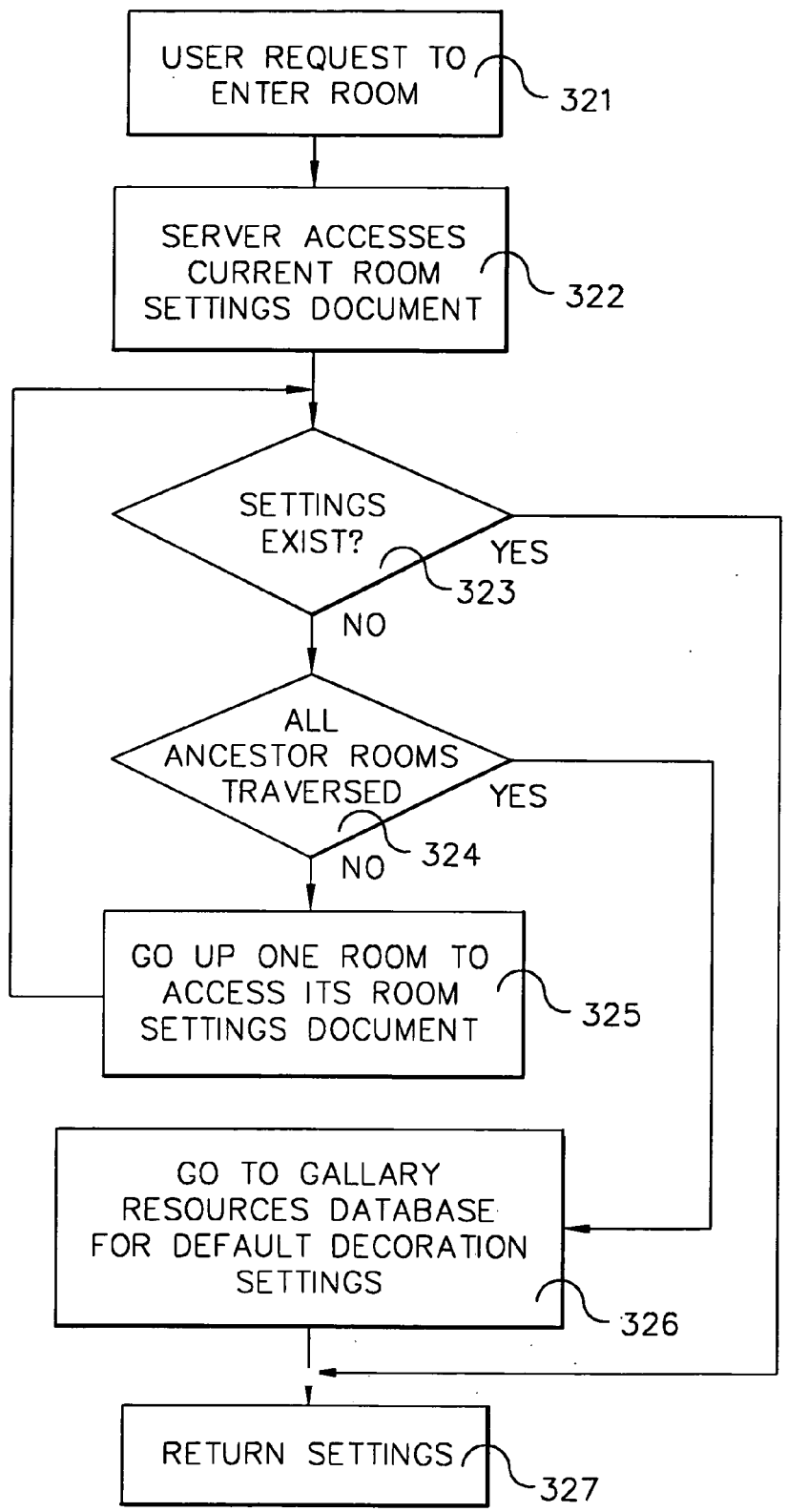
FIG. 32 illustrates a method for serving room decoration settings.

Referring to FIGS. 31 and 32, the processes for customizing room decoration and for decorating a room being entered are set forth.

For room decoration customization, in step 301, the user selects the action customize decorate. He is presented with two options: in step 302 to select a preset theme, or in step 303 to tweak (that is, modify) an existing theme.

Referring to FIG. 31, if the user selects option 1, in step 304 the server provides a list of themes stored in gallery resource database 292. In step 305, the user selects the theme from the list, and in step 306 the server copies the selected theme settings to the setting document for the room being decorated. In step 307, the server sends a new set of instructions to the user browser which represent the decoration, or aesthetic characteristics, of the room being decorated.

If the user selects option 2, in step 308 the server provides a list of options, or user interface (UI) elements, to tweak. In step 309, the user selects a UI element (or option) and in step 310 the server displays the possible tweakable, or modifiable, attributes for that element. In step 311 the user selects the attributes and indicates the changes. In step 312 the server modifies the room settings document, and in step 313 refreshes. This results in step 307, in which the server sends the new set of decoration instructions to the browser.

For decorating a room being entered by a user, in step 321 the user enters a request to enter a room. In step 322, the server accesses the current room settings document for the room to determine if settings exist. If so, in steps 323 and 327, those settings are returned to the user browser for displaying the room. If not, in steps 323 and 325 ancestor rooms are traversed, looking for a room with settings and, if not found, in step 326 the server accesses the gallery resource database to obtain default decoration settings for return to the user browser.

Collaboration

In accordance with another aspect of the invention, a user interface and data storage model is provided whereby a published piece of content on the web can be simultaneously edited by an author and saved periodically by the author, yet the published version doesn't get touched (modified) by viewers until the author is ready. This achieved by having the server manage both the published version and a draft under construction such that the published version is made available for viewing by some users while another user is modifying the draft, and then merging the two versions into a new published version. The server delivers to the user making the modifications a complete set of offline code, including a replica of the server and of the draft while maintaining a healthy replica with respect to security.

Replication

Figure 33:
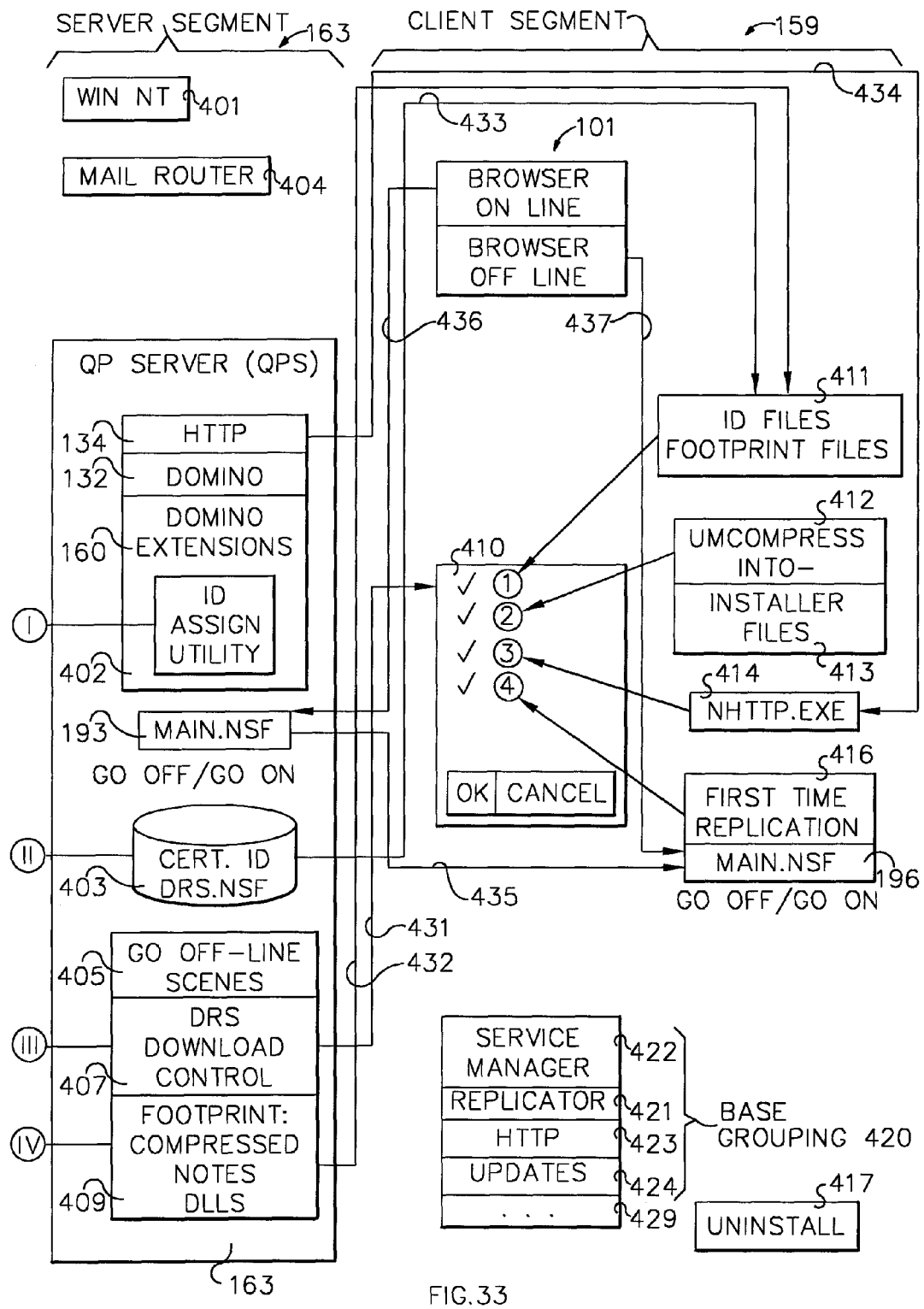
FIG. 33 is a system diagram illustrating in context the architectural components supporting the replication function.

Referring to FIG. 33, in accordance with the preferred embodiment of the architecture of the invention, there are provided a server side segment 163 and a client side segment 159. Server side elements 163 are used by a website developer to prepare a Domino application to work offline. Client side elements 159 are those elements which must be installed to an end-user's machine in order for the Domino application to run. Domino runtime services (DRS) 163 comprises utilities that help assemble an appropriately minimized set of files 409 to include for producing a client-side 159 install which can make a Domino web application run disconnectedly on a client machine. A DRS client 159 comprises a stripped won locally running Domino server, including service manager 422, dedicated to running only one Domino web application. This local server needs far fewer feature elements than a full online server. Client side elements are installed on the end user's computer by downloading and running the install program 422 that is built using DRS server side 163 elements.

A software system environment is organized into segments 159, 163, which are major configuration groupings. Within segments are items, which are software items which are environmental or deliverable items. QP server 163 is a deliverable item. Netscape 4.5 browser 101 is an example of an environment item. The sum of the segments define a system. Deliverable items include software units.

First, with respect to the server side segment 163. Environment items include, for example, WIN NT 401 as the operating system, mail router 404, and QuickPlace server 163, Domino server 132, HTTP task 134 for serving web pages, and Domino extension 160 for opening a Notes database. QP server extensions 160 are inside the Domino box, and an item within that box is the ID assignment utility 402.

Four, primary architectural components comprise the Domino Offline Services, and support the offline environment ID assignment extension. These are first (I), ID assignment utility 402, second (II) Domino runtime services (DRS.nsf) 403, third (III) DRS download control 407, and fourth (IV) footprint 409. The first architectural component is the ID assignment utility 402, which is a sub-task within the QP utility 160 involved in supporting the off line environment. The second architectural component is the ID certifier repository 403, which is a small DLL for executing the appropriate setup. The third architectural component is download control 407. The fourth architectural component on server 163 unique to going offline is a collection of compressed Notes DLL's, compressed for downloading, referred to as the "footprint" 409. These four architectural components, together comprise the Domino extensions required for taking offline a server, such as a QuickPlace server, including code, data, and a fully functional security model, to enable that server to function offline in either a web browser or Lotus client environment.

QuickPlace server (QPS) 163 keeps a copy of a Notes certifier identifier in DRS.nsf, and that certifier ID supports the dynamic creation and generation of Notes user ID's. Main.nsf is a QP database in which is maintained special pages, or scenes, dedicated to offline operation. These offline scenes trigger the DRS download controls, including active x and Netscape plug in. Active x is the name of a component model that extends Internet browsers. Java applets, active x comments, and Netscape plug ins are different ways to augment browser function with code that the browser executes.

When a user visits an offline page, the download function is triggered. Go offline scenes 405 are QP 163 pages in server 163 that provide instructions on how to go offline, and provides the download control with right parameters for downloading. In this context, down load includes downloading web site code, which is the minimum software needed for client segment 159 to run offline (that is, detached) from server 163.

In operation, a user at a browser visits a web site, encounters a download page, or offline scene, and activates download control with parameters specific to the web site being visited. In response, download control 407 loads to the client environment a set 435 of .nsf files for incrementally executing download functions. Four steps 435 are executed to incrementally install at client 159, from footprint 409, the agent files, full text index files, and so forth required to operate browser 101 offline.

The first step, step 411, determines which Notes ID is to be utilized. If the client is a browser (not a Lotus Notes client), this step 411 triggers ID assignment utility 402. ID assignment utility 402 obtains the certifier ID from repository 403, and from that generates the Notes ID which it passes to download control 407. With that Notes ID, download control selects and downloads the appropriate footprint files, or DLLs, 409.

The second step, step 412, an instance of download control 407 on the client side 159 uncompacts the downloaded footprint files to generate installer files 413.

The third step, step 414, executes the installer files which prompts the user for information, installs several execute files, including nhttp.exe; installs several DLLs, and prepares the Notes.ini files. At this point, a fully installed file system exists on the client, including the DLLs that comprise the runtime of Notes. nhttp.exe 414 is the same web server component code as http 134 on the server side. This file 414 is the program that serves web pages, together with the Notes run time DLLs that support it, and these accumulate in directories at the client in preparation for step 416, when Main.nsf 193 will be downloaded. This file 414 is a critical component, and is, in effect, the mini server task, including the same code that comprises the web server component at the server. As a result of this identity, both online and offline pages exhibit the same behavior to the user. Thus, browser 101, when operating on line, accesses web server 134, and when operating off line, accesses web server 414. In both cases, the behavior is the same.

Components installed by step 414 (step 416 brings down the data) include a base grouping 420, including the service manager 422 execute (.exe) file, the http component 423, previously described, update component 424, and replicator component 421. These are the key, or base grouping, of components brought down in step 414 and activated every time there is an offline configuration. Because replicator 421 is required to be kept up to date, and http 423 required to be viewable in browser, update service 424 keeps the other two (421 and 423) aware of each other's actions. When replicator 421 brings new documents to a database, it doesn't refresh the views. Because http 423 assumes the views are refreshed, update 424 sees that they are.

If more are services needed, step 414 may activate additional services 429. Other services 429 possibly includes mail dispatch, full text index, agents, Lotus script, Java back end classes, and so forth. These are controlled by the service manager 422. Service manager 422 is the program that the user interacts with after download is completed.

In the fourth step, step 416, first time replication brings down main.nsf by turning on the Notes DLLs with the Notes ID that was previously downloaded, and then running them as though they were a Notes client for replication. An advantage of this approach is that the replication and security model of this web client is exactly the same as that for a Notes client.

At this point, a user can start using this offline version of the web site.

Service manager 422 is a utility a user can launch from a desk top, from start menus, and from a driver tray, and behaves like a system driver. Such a driver, if clicked on in tray, gives in a pop up menu such options as online, offline, synchronize now, edit synchronization properties. Synchronization properties is a tabbed dialog (or, in QP, a web page), which is a piece of user interface for setting the replication schedule and any required user filters. Examples of user filters include filters on how much data to bring down: such as, days worth, no more than x bytes, or stop after an hour. Service manager 422 also launches other tasks as needed by service manager 422 without user intervention. Thus, service manager 422 is an easy interface to a customer, and is a smart manager of mini server tasks.

Architecturally, main.nsf 196 includes a cross link component—a piece of html or some kind of web element that is highly customized to a specific application and which is consistent in role to main.nsf 193, giving the user a visual indication of version of main.nsf is being used (online 193 or offline 196). With one click at the browser 101, the user can move to the other main.nsf version. This is useful after main.nsf is downloaded first time. Web browser 101, after download refreshes main.nsf 196, shows a go offline link that sits in top bar of the application, such as a QuickPlace application, view panel and when clicked switches the browser to the client http task 414 from the server http task 134. Thus, the off line url is for the client machine 159, and the on line url is for the server machine 163, and these url's only differ in the server name part of the url.

At this point, the user uses a personal copy of a web site. Replication is triggered thereafter by schedule or at user request.

Download is done using http protocol, transported on TCP/IP port 80. Notes replication is transported on TCP/IP port 1352. This arrangement allows for a fire wall between client 159 and server 163. This fire wall must be configured by the administrator to allow transfer because http is not a secure protocol. A security variation uses https for download, and encryption is turned on for replication protocols.

Uninstall 417, when executed, cleans everything brought down except for a version of download control 407 cached at client 159.

In accordance with the security model implemented by the preferred embodiment of the invention, the user ID is used by all processes, particularly the replicator, to assure that a user is not able to access anything to which the user is not entitled. Main.nsf offline 196 only includes what the user is allowed to see when accessing main.nsf 193 at the server.

Forms Creation and Maintenance

Figure 34:
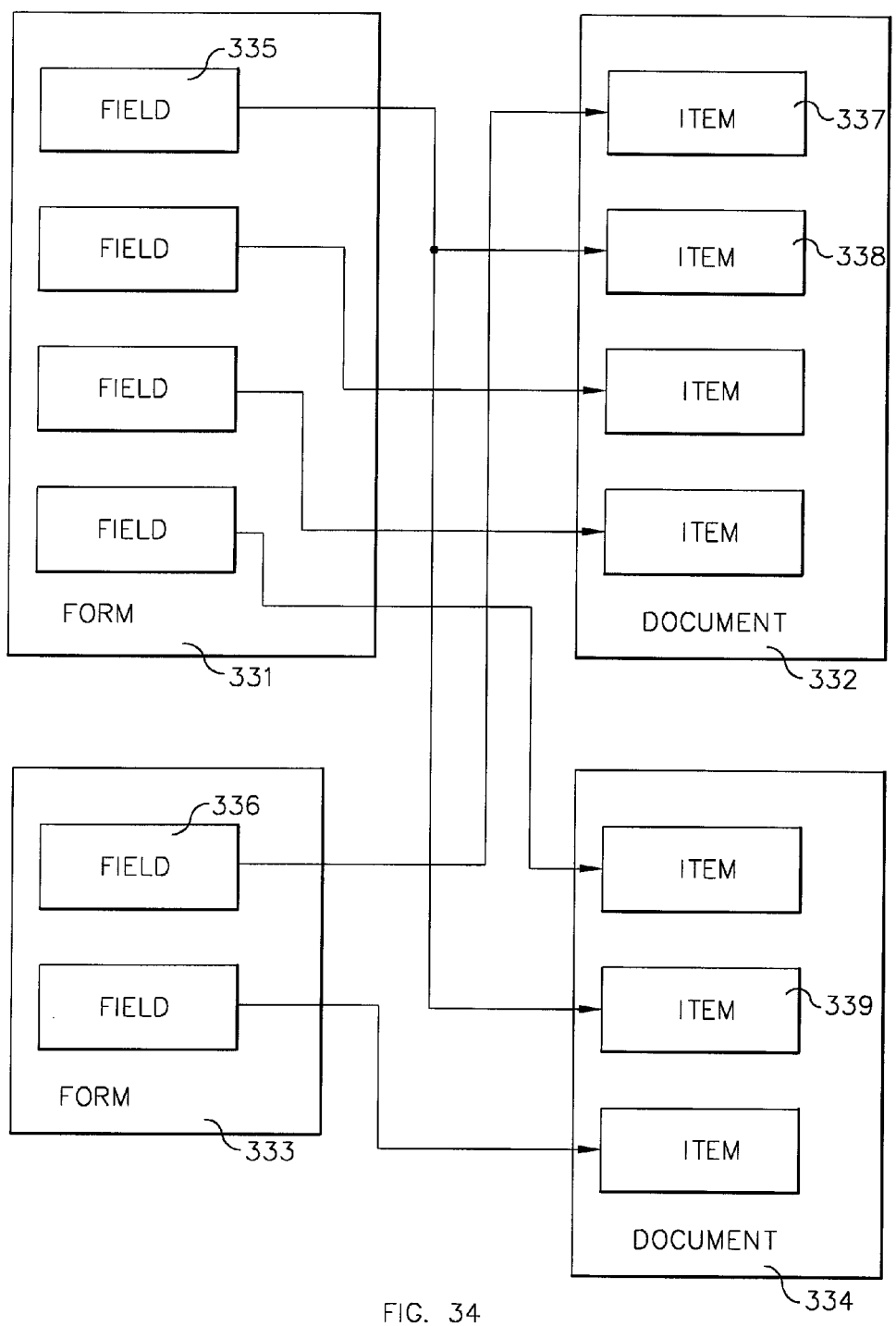
FIG. 34 illustrates the generation of a document and items from forms and fields.

Referring to FIG. 34, it is a further aspect of the invention that there is provided to a user at a browser the ability to create and maintain forms 331, 333, and incorporate them into a room. Any page, or document, in the system is created using a form, which is a layout that identifies page content in the terms of fields 335, 336, which map to items 337, 338 and 339, as illustrated. One form may be used to create more than one document, as is illustrated by field 335 of form 331, which is used in defining item 338 in document 332 and item 339 in document 334. A form provides fields and layout.

Figure 35:
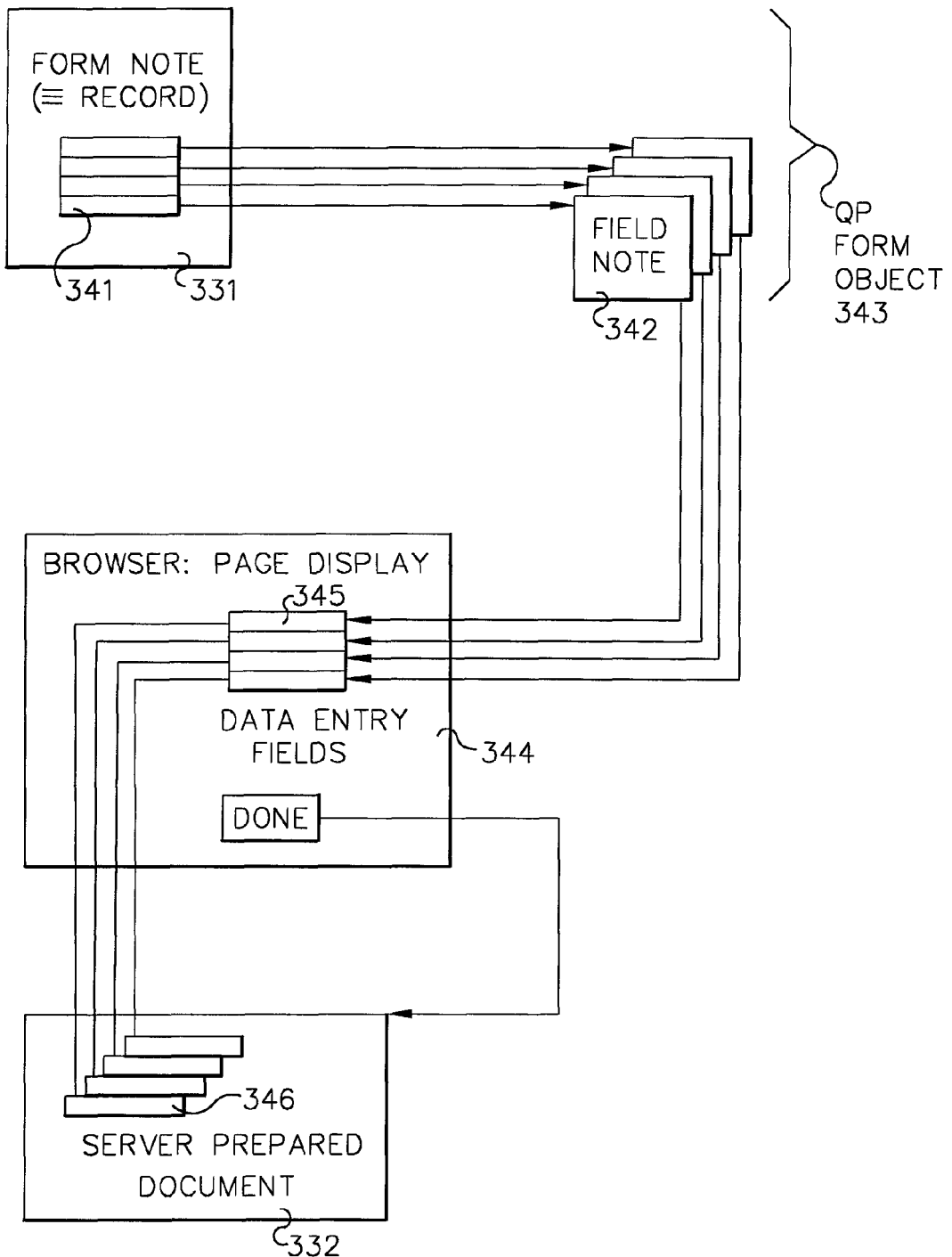
FIG. 35 illustrates the generation of a server prepared document.

Referring to FIG. 35, from a browser, a user with manager access to a room can create a new form by defining the fields that make up the form: name, field, type. Types are edit box, radio button, check box, attachment, and are the same as field types in Notes or HTML. User (manager) goes to customize page, selects forms page, and selects the new form button. A screen comes up asking for the name of form, the fields in the form, and the workflow attributes of that form. The user adds fields by selecting add fields, in response to which a list of field type appears. The user then chooses field type (edit box, check box, rich text, attachment, author, date, etc.). Behind the scenes, a note 331 is associated with the form and a note 342 is associated with each field. A field note 342 is associated with each field 341 in the form note 331. A QuickPlace form object 343 is a form note 331 and associated field notes 342. Depending on the type of field selected, each field note 342 has different attributes.

After a user has created a QuickPlace form, to put this form into action, this or some other user creates a page using this form. For example, an inventor may come into the place where this form is stored and address the form by the name given by the author. The QuickPlace system creates a page using the definition of the form which includes the field notes 342, the layout from the form note 341, and workflow attributes. A document is a type of note. Other types of notes are view, folder, agent and form. When user hits "done", browser sends a page with data to server which creates the resulting document 332. The page 332 presented to the user by the server can be used by the user, who fills out the values for the fields 346. Thus, a document is created by a server from a browser entered page.

By providing an interactive facility in QuickPlace for accepting and storing form data in an object store, which is a database or page, at the server, there is provided a way for a client at a browser to create forms which include a definition of where and how data should be stored, and which enables others to manipulate the form.

A Notes form is a Notes object that is used as a form by a notes designer and user. In QuickPlace, the client is the browser, so Notes forms need not be used. Rather attributes of a QuickPlace form are stored in a note using a record in a database.

Notes offers a number of objects, including the Lotus Notes Product, which includes databases, which includes notes, which are view, folder, form, agent, and document notes. Applications are built on this model.

In Lotus Notes, a view is a collection of documents. A folder is a collection of documents. A form is an object that contains fields and layout, and is used for the creation of documents. A document is a record in a data base. An agent is a set of instructions or logic that perform a given function, such as a macro defined by the agent creator.

In QuickPlace, Notes objects are fine tuned to support a Notes client, where the client is a web browser. In accordance with the QuickPlace model, there are provided places, which contain rooms, members, forms and fields, and where a room contains folders, and folders contain pages.

To build or implement this QuickPlace model on top of Notes object model a Place becomes a file system directory (which is not a notes object), a room becomes a note (of type database), a folder becomes a note (that stores folder attributes)+folder or a note (a store of folder attributes)+view, depending upon which is most convenient. A page is a note (of type page, containing data associated with page), a member is a note (of type member) in the member's database, a form is a note (a form note), and a field is a note (a field note). Note types are page, member, folder, field, form, and room.

Workflow

In accordance with another aspect of the invention, workflow functionality is provided at a browser. A user fills out and submits a form on the web. It then travels to individuals in a prescribed set and order. The form is submitted via HTTP to a server. The server creates other pages and elements to be delivered back to browser. These elements store state information about the pages submitted to track who has had, and who needs to get the form and in which order. When a browser defines a workflow document, E-mail notifications are sent by the server to each person along the path. In this way, a user is enabled to define a workflow document with a browser that can be executed by many other users with browsers.

In this workflow process, after an author has created a form with several fields, workflow logic is added. When creating the form, author decides type of work (editor in chief, approval cycle, multiple editors). Editor in chief allows specification of a person to approve the page before it will be published. Approval cycle specifies a list of individuals that the page is to go to serially; that the pages that are still pending be placed in a holding folder; who can edit the page after final approval—final reviewer or page creator; and who can read the page after approval. In creating and using workflow forms, the QuickPlace is accessed by room, then room options, forms, create new form, workflow buttons are selected to bring up a screen with all of the options.

Workflow attributes of a QuickPlace form created by a browser are stored with the form note, enabling the QuickPlace server to properly control the workflow routing. A page created from the form includes the security items h_readers and h_authors, each of which includes a list of one or more people. Readers can read, authors can edit, thus allowing security to be at the page level. h_cycle list provides a list of people in the approval cycle. At end of approval cycle, the page can be directed to a specific folder. Readers and authors are security items stored with every page; other attributes (than these security attributes) are strictly workflow attributes, such as current approver, which is used to determine where the page goes following current approval, and so forth.

In accordance with a preferred embodiment of the invention, five different workflow processes are supported. These are standard workflow, simple submit workflow, approval cycle workflow, editor-in-chief workflow, and multiple editors workflow.

First, standard workflow. This workflow process allows the user to either publish a page immediately or publish with options. This is the workflow process that is used for the standard forms which ship with QuickPlace and is the default workflow process for custom forms. Options available to a user who creates a page which uses this workflow are (1) publish immediately, or (2) publish with options.

Publish Immediately: If the current context is a folder, the page is published and put in that folder. Otherwise the user is asked where it is to be put (in a folder or in the table of contents (TOC)). On a custom form, the creator of the form can also indicate what folder this type of page should be put in, in which case the user is not asked for this information.

Publish With Options: The user can publish the page or save it as a draft. If it is a new page, the user is allowed to select where it is to be put (folder or TOC). If a previously published page is being edited, the user can choose to revert to the published version. If it is being published, the user can select from none to all of the following options:

Notify: allows the user to send an E-mail with a link to the current page and some explanatory text.

Add Authors: allows the user to specify who is allowed to edit this page (if not selected, only the author can edit the page).

Restrict Readers: allows the user to specify who is allowed to read this page (if not selected, everyone can read it).

Add to Calendar: allows the user to specify a date and time so the page will display in the calendar as well as the folder in which it is put.

Move: this is only available during edit (not for new pages) and allows the user to move the page to a different folder or to the TOC.

Second, simple submit workflow. This workflow process allows the creator of a custom form to indicate what to name the submit action (for example, it may be named "Done"). This action then works exactly like Publish Immediately, described above.

Third, approval cycle workflow. This workflow process allows the creator of a custom form to indicate up to four approvers for a sequential review workflow, and to choose among the following five form creation options: (1) In Process Folder (optional), which specifies what folder the page will reside in during the approval cycle (see below for what happens at final approval). (2) Final Editor, which specifies whether the author or the final approver is the person allowed to edit the page after approval is complete. (3) Final Readers, which specifies whether everyone, or just the author and approvers, are allowed to read the page after approval is complete. (4) Final Location, which indicates whether the final approver determines where the page goes (folder or TOC), or that the page will simply be moved to a specific folder upon final approval. (5) Rejection Destination, which specifies who the next person in the workflow is if any reviewer rejects the page, either the author or the previous reviewer.

In approval cycle workflow processing, two form use options are available. First, when a user creates a page with this form, a Submit action is provided. Selection of Submit brings a scene where the user can select Submit or Submit with Explanation, and if In Process Folder (see above) is not indicated, the user chooses where to put the page (folder or TOC). Selection of Submit automatically sends an email to the first approver, with a link to the page, notifying there is a page which needs review and making the first approver the sole editor of the page. Submit with Explanation allows the author to add some explanatory text to the email. Second, when a reviewer has reviewed and possibly modified the page, a Submit action is also available. Selection of Submit brings a scene similar to the one described above, except that options to Reject, or Reject with Explanation are also presented. Rejected pages are moved to the Rejection Destination (described above). E-mail is sent to the next reviewer, and the next reviewer becomes the sole editor of the page. If the current reviewer is the final reviewer and Final Location (above) is set to final approver, the destination for the page (folder or TOC) is selected.

Fourth: editor-in-chief workflow. This workflow process is essentially a single approver workflow. The options described above are automatically set as follows and, with one exception, are not modifiable by the custom form creator. If the form creator wants different options, an approval cycle workflow process may be used with one approver. The option defaults for editor-in-chief workflow are as follows. (1) In Process Folder (optional) is the only modifiable option and defaults to none. (2) Final Editor: the page author is the editor (if the page is re-edited, it goes through the approval again). (3) Final Readers: everyone can read. (4) Final Location: approver decides. (5) Rejection Destination: the page author.

Fifth: multiple editors workflow. This workflow process is exactly like the Standard Workflow, except that instead of the author indicating who can edit the page, all people with author access to the room are allowed to edit the page.

Forms Upload

In accordance with a further object of the invention, a user can decide the appearance of an HTML form using an HTML editor and save to file. To make it a QuickPlace form, the HTML file is uploaded through a bucket, and the server converts it into a QuickPlace form. In this manner, externally designed HTML forms can be incorporated into a QuickPlace site. Once a form is a QuickPlace object, it has additional features. This form may then be offered to authors to create new documents. It is available in the room in which the user is operating, and can be adapted to workflow.

Upload Agents

In accordance with a further object of the invention, a user with a browser can write and upload to a server logic that will react to the submission of a page. By way of example, a form is developed to allow people to submit patent applications. This is put in QuickPlace patents place. To manage the creation of these pages, logic is added to the form via Lotus script or Java. For example, whenever a page is submitted, and the description includes "workflow", then the page is filed in a folder for "workflow". In this way a user may independently develop logic and then upload it to his QuickPlace place.

TABLE 1

| | QUICKPLACE COMMANDS | |
|---|---|---|
| 1 | h__ChangeACL | Creates, removes, or modifies new access |
| 2 | | to a room for a list of users. |
| 3 | | Arguments include h__SetEntryNames, |
| 4 | | h__SetEntryTypes, and h__SetAccessLevels. |
| 5 | h__CheckHuName | Checks if a given QuickPlace Name h__Name |
| 6 | | is available. Two QuickPlaces cannot |
| 7 | | have the same name. |
| 8 | h__CreateFolder | Creates a QuickPlace folder. Arguments |
| 9 | | include the user visible name of the new |
| 10 | | folder and its style, whether standard |
| 11 | | list, headline, slide show, response |
| 12 | | list, or ordered list. Arguments |
| 13 | | include h__Name, h__FolderStyle, |
| 14 | | h__FolderStorage. |
| 15 | h__CreateGroup | Creates a group composed of the |
| 16 | | specified users. Once created, the |
| 17 | | system mains four fields for each group, |
| 18 | | including: h__Name, h__SystemName, |
| 19 | | h__Members, and h__Type. |
| 20 | h__CreateOffice | Creates a new QuickPlace (formerly known |
| 21 | | as an office). This means creating a |
| 22 | | directory for the QuickPlace, creating |
| 23 | | the tope level room specified (and any |
| 24 | | subrooms specified by that room), and |
| 25 | | creating a manger for the QuickPlace. |
| 26 | | Arguments include h__Name, h__AreaType, |
| 27 | | h__AeName, h__UserName, h__Password, and |
| 28 | | h__EmailAddress. |
| 29 | h__CreateRoom | Creates a QuickPlace room as a subroom |
| 30 | | of the current room with the specified |
| 31 | | aesthetic set and of the specified room |
| 32 | | type. Arguments include h__Name and |
| 33 | | h__AreaType. |
| 34 | h__CreateUsers | Creates members in a Place. Arguments |
| 35 | | include: h__SetUserNames, h__SetPasswords, |
| 36 | | h__SetEmailAddresses, h__SetRewLevels, |
| 37 | | h__SetEntryNames, and h__SetAccessLevels. |
| 38 | h__DeleteFolder | Deletes the current folder. No |
| 39 | | arguments. |
| 40 | h__DeleteGroups | Deletes one or more groups from a |
| 41 | | QuickPlace. Argument: h__SetGroupNames. |

TABLE 1-continued

| | QUICKPLACE COMMANDS | |
|---|---|---|
| 42 | h__DeleteOffice | Deletes one or more QuickPlaces. |
| 43 | | Argument: h__HaikusToDelete, which is a |
| 44 | | textlist of QuickPlaces to be deleted. |
| 45 | h__DeletePages | Deletes pages indicated in the argument |
| 46 | | h__SetDeleteList. |
| 47 | h__DeleteRoom | Deletes the current room. No arguments. |
| 48 | h__DeleteUsers | Deletes the specified users from the |
| 49 | | system. Argument: h__SetUserNames. |
| 50 | h__MoveRoom | Moves a room within the room hierarchy. |
| 51 | | Argument: h__NewRoomName, which is the |
| 52 | | nsf name of the room's new parent. |
| 53 | h__ReorderRoomArea | Used to change a room name, set the mail |
| 54 | | delivery into a specific room, show or |
| 55 | | hide the calendar, security information |
| 56 | | to reader and authors, and to reorder |
| 57 | | the table of contents. |
| 58 | h__SendMail | Sends an email to the indicated |
| 59 | | recipients. Arguments include |
| 60 | | h__SetPublishEmailAddresses, h__SetIP |
| 61 | | PublihsEmailSubect, and |
| 62 | | h__SetPublishEmailMessage. |
| 63 | hSetAesthetic | Sets aesthetics on a room by copying |
| 64 | | from a stored aesthetic set, copying |
| 65 | | from the parent's aesthetics, or |
| 66 | | resetting a room to use is parent's |
| 67 | | aesthetics. Arguments include |
| 68 | | h__AestheticCmd and h__AeName, which is |
| 69 | | the name of the aesthetic set stored in |
| 70 | | the QuickPlace Resources |
| 71 | | (Resources.nsf). |
| 72 | h SpellCheck | Spell checks the indicated test. |
| 73 | | Argument: h_PageText. |
| 74 | h UpdateGroup | Changes the name or membership list of a |
| 75 | | group. Arguments include h_SystemName, |
| 76 | | h_Name, and h_Members. |
| 77 | h UpdateUser | Changes a user's information. Arguments |
| 78 | | include h_SystemName, h_UserName, |
| 79 | | h_FirstName, h_LastName, h_EmailAddress, |
| 80 | | h SetPassword and h Phone. |

(See Table 2 for definitions of the fields listed as arguments.)

TABLE 2

| | FIELDS OF QUICKPLACE OBJECTS | |
|---|---|---|
| 1 | BASIC | |
| 2 | h__Type: | The type of object. One of: page, |
| 3 | | folder, room, subroom, error page, |
| 4 | | roomType, h__Member, h__Group, h__Form, and |
| 5 | | h__Field. |
| 6 | h__Name: | The user visible name of this object. |
| 7 | h__SystemName: | The name of this object as known to the |
| 8 | | system. |
| 9 | h__isSystem: | 1 = This is a system object. |
| 10 | ROOM | |
| 11 | h__HaikuName: | The name of this Place. |
| 12 | h__AreaType: | The name of the template used to create |
| 13 | | this room. |
| 14 | h__AreaParent: | The name of the parent database. |
| 15 | h__ShowSecurity: | if h__SetSecurity = 1, servers sets |
| 16 | | h__ShowSecurity to 1. |
| 17 | h__SetCalendar: | 1 = Show the Calendar in the sidebar. |
| 18 | h__SetTutorial: | 1 = Show the Tutorial in the sidebar. |
| 19 | h__SetSecurity: | 1 = Show Security in the sidebar for |
| 20 | | Readers and Authors (if they select |
| 21 | | Security in this case they will see only |
| 22 | | their own information). |
| 23 | h__MailDb: | The name of the database that receives |
| 24 | | email addressed to this Place. |
| 25 | h__LastAttachmentDirectory: | Last directory used when |
| 26 | | getting attachments. |

TABLE 2-continued

FIELDS OF QUICKPLACE OBJECTS

| | | | |
|---|---|---|---|
| h__DirtyAesthetics: | Number which indicates which items should be checked (once a part of the aesthetics has been tweaked, the check mark indicates that part has already been changed). | | |
| h__AreaHasAesthetics: | 1 = This room has its own aesthetic settings. | | |
| FOLDER | | | |
| h__FolderStyle: | One of standard list, headline, slide show, response list, and ordered list. | | |
| h__FolderStorage: | The name of the folder as known to the system. | | |
| h__CanAddPages: | 1 = All authors can add pages to this folder. 0 = Only managers can add pages to this folder. | | |
| FIELD | | | |
| h__ContainerUNID: | The UNID of the Form which contains this field. | | |
| h__FieldType: | h__Subject | Subject | |
| | h__TextInput | Simple text (<input>) | |
| | h__RichText | Rich text | |
| | h__Attachments | Attachments | |
| | h__TextPopup | Text select list (<select><option>) | |
| | h__NamePopup | Select listing members of the of the QuickPlace | |
| | h__DateControl | Date field with date picker widget | |
| | h__TimeControl | Select lists for hours, minutes, AM/PM | |
| | h__CalendarControl | Includes date and time controls and a duration field | |
| | h__Serial | A unique number | |
| | h__Static | Static text and/or graphic | |
| | h__DocAuthor | Original author of the page | |
| | h__DocCreated | Creation date of the page | |
| | h__DocModified | Modified date of the page | |
| | h__DocSize | Size of the page | |
| h__FieldLabel | Instructional information, only displayed in edit mode, that might be useful for someone editing this field. | | |
| h__FieldFormat: | Indicates formatting options for | | |
| | h__CaledarControl | Whether date, time and/or duration are included | |
| | h__Subject | Whether banner is displayed or optional. | |
| h__FieldIsRequired | 1 = The field is required and the user will be prompted if it is not filled out. | | |
| PAGE | | | |
| h__Form: | The QuickPlace form used to create this page. | | |
| h__PageType: | Usually null. Could also be h__Response, h__Revision, or h__Mail. | | |
| h__NameIsBanner: | 1 = The name of this page should be displayed as a banner. | | |
| h__Originator: | The creator of this page. | | |
| FORM | | | |
| h__FormDescription: | The description of the form that appears in the "New" scene. | | |
| h__WorkflowType: | h__ApprovalCycle | Allows 1-4 approvers and some other options | |
| | h__EditorInChief | Allows 1 approver and fewer options. | |
| | h__MultipleEditors | All members of QP can edit pages created with this | |

TABLE 2-continued

FIELDS OF QUICKPLACE OBJECTS

| 100 | | h__Standard | None of the above |
|---|---|---|---|
| 101 | h__SetPageComponentsView: | Should = h__FieldDefinitions. | |
| 102 | h__IsUserDefined: | h__True means this is a custom form. | |
| 103 | h__PublishInFolder: | UNID of the folder + "|" + h__FolderStorage | |
| 104 | | name of the folder. | |
| 105 | MEMBER | | |
| 106 | h__Password: | This member's password. Encrypted with | |
| 107 | | @Password. | |
| 108 | h__FirstName: | This member's first name. | |
| 109 | h__LastName: | This member's last name. | |
| 110 | h__PhoneNumber: | This member's phone number. | |
| 111 | h__EmailAddress: | This member's email address. | |
| 112 | GROUP | | |
| 113 | h__Members: | The list of members who belong to this | |
| 114 | | group. | |
| 115 | PUBLISHING | | |
| 116 | h__IsPublished: | 1 = This object is currently published. | |
| 117 | h__IsHidden: | 1 = This object is not shown to the user. | |
| 118 | h__SetReadScene: | The name of the default scene (subform) | |
| 119 | | to use when viewing this object. | |
| 120 | h__SetEditScene: | The name of the default scene (subform) | |
| 121 | | to sue wen editing this object. | |
| 122 | h__PublishedVersionUNID: | If this object is being edited and | |
| 123 | | the current object is the draft | |
| 124 | | version, the UNID of the published | |
| 125 | | version of this object. | |
| 126 | h__DraftVersionUNID: | If this object is being edited and | |
| 127 | | the current object is the published | |
| 128 | | version, the UNID of the draft | |
| 129 | | version of this object. | |
| 130 | h__LastTimePutAway: | The last time that this object was | |
| 131 | | changed: Published or Saved under | |
| 132 | | construction. | |
| 133 | LOCATION | | |
| 134 | h__FolderUNID: | The name or UNID of the Notes Folder | |
| 135 | | where this page resides. | |
| 136 | h__IsInToc: | 1 = This object is shown in the Table of | |
| 137 | | Contents (sidebar). | |
| 138 | h__CurrentPosition: | The position of this object with respect | |
| 139 | | to other objects in the collection. | |
| 140 | h__SetParentUNID: | If this is a child or response object, | |
| 141 | | the UNID of the parent object. | |
| 142 | SECURITY | | |
| 143 | h__Readers: | If this object is protected from | |
| 144 | | readership, the list of names, groups, | |
| 145 | | and or roles that can read this object. | |
| 146 | h__Authors: | If this object is protected from | |
| 147 | | authorship, the list of names, groups, | |
| 148 | | and or roles that can author this | |
| 149 | | object. | |
| 150 | WORKFLOW | | |
| 151 | h__WorkflowState: | h__New | Created but not yet |
| 152 | | | submitted for approval. |
| 153 | | h__Submitted | Has been submitted and it |
| 154 | | | is being reviewed. |
| 155 | | h__Published | Has been approved. |
| 156 | | h__Rejected | Has been rejected. |
| 157 | h__SetNextStageUser: | The name of the next person in the | |
| 158 | | workflow cycle. | |
| 159 | h__CurrentApprover: | A number designating the current person | |
| 160 | | in the workflow cycle. 0 means the | |
| 161 | | Originator. The list of persons | |
| 162 | | associated with the workflow cycle is | |
| 163 | | stored in the form used to create this | |
| 164 | | page. See h__Form. | |
| 165 | CALENDAR | | |
| 166 | h__CalendarDate: | The calendar fields are present when the | |
| 167 | | page has been added to a calendar. The | |
| 168 | | date that his object should appear in | |
| 169 | | the calendar. | |

TABLE 2-continued

FIELDS OF QUICKPLACE OBJECTS

| 170 | h_CalendarTime: | The time that this object should appear in the calendar. |
| 171 | | |
| 172 | h_CalendarDuration: | the length of time associated with this object when viewed in the calendar. |
| 173 | | |

ADVANTAGES OVER THE PRIOR ART

It is an advantage of the invention that there is provided a system and method which enables a user to accelerate productivity by easily creating and maintaining collaborative spaces on a network.

It is an advantage of the invention that there is provided a system and method which enables a user to customize security attributes of rooms in a collaborative space including a hierarchy of rooms.

It is an advantage of the invention that there is provided a system and method for uploading documents which involve the more intuitive process of dragging and dropping the document to a spot on the site where it is to be rendered.

It is an advantage of the invention that there is provided a system and method for managing security of files in a hierarchical database such that security may increase or decrease at a child with respect to its parent.

It is an advantage of the invention that there is provided a system and method for enabling browser creation and modification of web sites.

It is an advantage of the invention that there is provided a system and method for enabling uninterrupted online and offline updating of a web site.

It is an advantage of the invention that there is provided a system and method whereby the aesthetic characteristics of a parent room may be inherited by its children rooms.

It is an advantage of the invention that there is provided a system and method for enabling a browser to define a work flow document and process.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid medium, magnetic or optical wire, tape or disc, or the like, readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A collaboration space created as a web site by a user at a browser including a plurality of rooms in a hierarchical structure with access control list control on rooms and access control list control on forward pointers to child rooms, comprising:

said web site residing in a memory of a web server and including a place comprising a plurality of subrooms, each subroom being an independent entity belonging to said place said web server including an HTTP server interfaced with the Internet, said place having a first data note including a directory of members of said place and each subroom within said place having a data note associated therewith containing an access control list of members selected exclusively from said directory of members by a member of said place having manager authority with respect to said subroom for specifying users of said place authorized to access said subroom;

forward and reverse pointers for linking said subrooms, each said forward pointer to a child room including indicia identifying said child room, indicia specifying the address location of the entity forming said child room, and a readers field for providing access control list control on said forward pointer;

said readers field being a members object for identifying those members of said subset of members of said place authorized to access a parent subroom that are also authorized to access a child subroom and for each member of said subset of members a level of authorization;

a document readers field for a document containing data in said subroom being a members object for identifying a subset of members of said place authorized to access a subroom who are also authorized to access said document; and said collaboration space comprising a hierarchy of rooms, each room being a place in collaboration space including said directory of members; said directory of members, said access control list of members, and said readers field selectively providing increased, decreased, and maintained access to a child place in collaboration space, with access at any level of authority to a child place enabled only for those authorized to access a corresponding parent place, and whether a link to a child place will be enabled for a specific user in its corresponding parent place.

2. The collaboration space of claim 1, said levels of authorization including manager, author, and reader.

3. A collaboration space created as a web site by a user at a browser, comprising:

a place included in said web site, said web site residing in a memory of a web server, said place comprising a plurality of rooms in a hierarchical structure linked by forward and backward pointers, said web server including an HTTP server interfaced with the Internet;

a member directory for said place identifying users authorized to enter said place;

each said room comprising one or more pages, and for each said room a members object for identifying a subset of members of said place authorized to access said room and for each member a level of authorization, each member of said subset of members being a user authorized in said member directory to enter said place;

said rooms including a parent room and a child room, and said pointers comprising forward and backward pointers for enabling the security of each said room to be independently managed, said forward pointers including indicia identifying said child room, indicia specifying the address location of the database forming said child room, and a readers field for providing access control list control on said forward pointer, said readers field for identifying those members of said subset of members of said place authorized to access a parent room that are also authorized to access a child room; and said collaboration space comprising a hierarchy of rooms, each room being a place in collaboration space including a member directory; said member directory, said members object, and said readers field selectively providing increased, decreased, and maintained access to a child place in collaboration space, with access at any level of authority to a child place enabled only for those authorized to access a corresponding parent place, and whether a link to a child place will be enabled for a specific user in its corresponding parent place.

4. The collaboration space of claim 3, said readers field including an access authority for each reader authorized to enter said room selectively as manager, author or manager.

5. The collaboration space of claim 3, each said forward pointer being a secure pointer by carrying the same level of security as the child room to which it points.

6. The collaboration space of claim 5, each said forward pointer carrying in said readers field the same security as that of the subroom to which it points.

7. The collaboration space of claim 6, further comprising a display for presenting to a specific user viewing a parent room a listing of its subrooms, said listing including for said specific user only those subrooms for which said readers field in said forward pointer includes an entry authorizing access by said specific user.

8. A method for controlling access to rooms:

maintaining for a collaboration place an access control list identifying those users authorized to enter said place, said collaboration place including said rooms within said collaboration place and created as a web site by a user at a browser, said web site residing in a memory of a web server including an HTTP server interfaced with the Internet;

providing forward and reverse pointers linking said rooms in a hierarchical structure within said place, said forward pointers including indicia identifying a child room, indicia specifying the address location of the database forming said child room, and a readers field for providing access control list control on said forward pointer, said readers field exclusively specifying a subset of said users authorized to enter said place;

displaying a parent room to a specific user, said parent room including a list of children rooms for which said readers fields on said forward pointers authorize said specific user access; and said collaboration space comprising a hierarchy of rooms, each room being a place in collaboration space including an access control list; said access control list and said readers field on forward links from a parent place to a child place selectively providing increased, decreased, and maintained access to said child place in collaboration space, with access at any level of authority to said child place enabled only for those authorized to access a corresponding parent place, and whether a link to a child place will be enabled for a specific user in its corresponding parent place.

9. A method for creating a child room within a collaboration place data base created as a web site by a user at a browser, comprising:

providing for said collaboration place data base a first access control list identifying users authorized to access said data base, said collaboration place database created as said web site, said web site residing in a memory of a web server including an HTTP server interfaced with the Internet;

providing for said child room a back pointer to a parent room; and providing at said parent room for said child room a forward pointer from said parent room to said child room, said pointer including indicia identifying said child room, indicia specifying the address location of the database forming said child room, and a readers access field listing a subset of users in said first access control list who are users authorized to access said child room for providing a second access control list specific to said forward pointer;

initially including in said readers access field for a child room created from a form users identified in a form access list identifying users authorized to read rooms created from said form;

limiting reader access in said readers access field to said child room for a specific user to no more than the access granted said specific user in said first access control list; and said collaboration space comprising a hierarchy of rooms, each room being a place in collaboration space including an access control list; said access control list and said readers access field on forward links from a parent place to a child place selectively providing increased, decreased, and maintained access to said child place in collaboration space, with access at any level of authority to said child place enabled only for those authorized to access a corresponding parent place, and whether a link to a child place will be enabled for a specific user in its corresponding parent place.

10. A program storage device readable by a machine, tangibly embodying a program of instructions executable by a machine to perform a method for controlling access to rooms said method comprising:

maintaining for a collaboration place a first access control list identifying those users authorized to enter said place, said collaboration place including said rooms within said collaboration place and created as a web site by a user at a browser, said web site residing in a memory of a web server including an HTTP server interfaced with the Internet;

providing forward and reverse pointers linking said rooms within said place, said forward pointers including indicia identifying a child room, indicia specifying the address location of the database forming said child room, and a second access control list including a readers field specifying each user having manager, author, and reader access to said child room, said readers field exclusively specifying a subset of said users authorized to enter said place;

displaying a parent room to a specific user, said parent room including a list of children rooms for which said readers fields on said forward pointers authorize said specific user access; and said collaboration space comprising a hierarchy of rooms, each room being a place in collaboration space including an access control list; said first access control list, and second access control lists on forward links from a parent place to a child place, selectively providing increased, decreased, and maintained access to said child place in collaboration space, with access at any level of authority to said child place enabled only for those authorized to access a corresponding parent place, and whether a link to a child place will be enabled for a specific user in its corresponding parent place.

11. A computer program product for controlling access to rooms, comprising:

a computer readable medium;

first program instructions for maintaining for a collaboration place a first access control list identifying those users authorized to enter said place, said collaboration place including said rooms within said collaboration place and created as a web site by a user at a browser, said web site residing in a memory of a web server including an HTTP server interfaced with the Internet;

second program instructions for providing in a parent room second access control list identifying a subset of those user authorized to enter said place who are also authorized to enter said parent room with manager, author, or user access;

third program instructions for providing forward and reverse pointers linking said parent room with a child room in a double-linked list within said place, said forward pointers having a readers field providing a third access control list on said forward pointer, said third access control list providing access to said child room for those members who are included in said second access control list who are also authorized to access said child room;

fourth program instructions for displaying a parent room to a specific user, said parent room including on said forward pointers a list of children rooms for which said readers fields authorize said specific user access;

fifth program instructions establishing said collaboration space as comprising a hierarchy of rooms, each room being a place in collaboration space including an access control list; said first access control list, said second access control list, and said third access control list selectively providing increased, decreased, and maintained access to said child place in collaboration space, with access at any level of authority to said child place enabled only for those authorized to access a corresponding parent place, and whether a link to a child place will be enabled for a specific user in its corresponding parent place; and wherein said first, second, third, fourth, and fifth program instructions are recorded on said computer readable medium and executable by a machine.

* * * * *